United States Patent
Ogushi et al.

(10) Patent No.: US 7,831,283 B2
(45) Date of Patent: Nov. 9, 2010

(54) SENSOR NETWORK SYSTEM AND SENSOR NODE

(75) Inventors: Minoru Ogushi, Kodaira (JP); Keiro Muro, Koganei (JP); Toshiyuki Odaka, Fuchu (JP); Kei Suzuki, Kokubunji (JP); Shoji Suzuki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 664 days.

(21) Appl. No.: 11/882,056

(22) Filed: Jul. 30, 2007

(65) Prior Publication Data
US 2008/0070614 A1 Mar. 20, 2008

(30) Foreign Application Priority Data
Sep. 14, 2006 (JP) .............................. 2006-248874

(51) Int. Cl.
H04B 1/38 (2006.01)
(52) U.S. Cl. ......................................... 455/574; 455/69
(58) Field of Classification Search ................. 455/574, 455/127.5, 67.11, 68, 69
See application file for complete search history.

(56) References Cited

U.S. PATENT DOCUMENTS 7,676,251 B2 * 3/2010 Sugie et al. ................. 455/574
2004/0266494 A1 * 12/2004 Ruuska et al. .............. 455/574
2006/0019695 A1 1/2006 Miyazaki et al.
2006/0039316 A1 2/2006 Ogushi
2006/0128414 A1 6/2006 Shida et al.

FOREIGN PATENT DOCUMENTS

| JP | 2004-320153 | 4/2003 |
|---|---|---|
| JP | 2006-033674 | 7/2004 |
| JP | 2006-060515 | 8/2004 |
| JP | 2006-173691 | 12/2004 |

* cited by examiner

Primary Examiner—Tu X Nguyen
(74) Attorney, Agent, or Firm—Stites & Harbison, PLLC; Juan Carlos A. Marquez, Esq

(57) ABSTRACT

A plural-data transmission Start message is transmitted prior to transmission of plural data to an intermittent operation type wireless communications terminal, and when transmission of plural data is completed, a plural-data transmission End message is transmitted. The terminal which received the plural-data transmission Start message can change over the sleep period of the aforesaid intermittent operation to a shorter sleep period. Thereby, an improvement in the response performance in the case of plural-data delivery can be simultaneously obtained while maintaining the low power performance of a sensor node.

10 Claims, 10 Drawing Sheets

FIG. 13

Multiple Data Buffered
―――――――――――――――――
Generate [Start-BT Indication]

OFF-BT ⇄ ON-BT

Zero Data Buffered
―――――――――――――――――
Generate [Stop-BT Indication]

FIG. 14

| Sensor Node Index | Sensor Node Address | PAN ID | Gateway Node Address |
|---|---|---|---|
| (SS1) | (SSaddr1) | (PAN1) | (GWaddr1) |
| (SS2) | (SSaddr2) | (PAN2) | (GWaddr2) |
| (SS3) | (SSaddr3) | (PAN2) | (GWaddr2) |
| ⋮ | ⋮ | ⋮ | ⋮ |
| (SS7) | (SSaddr7) | (PAN3) | (GWaddr3) |
| (SS8) | (SSaddr8) | (PAN3) | (GWaddr3) |
| ⋮ | ⋮ | ⋮ | ⋮ |

SENSOR NETWORK SYSTEM AND SENSOR NODE

CLAIM OF PRIORITY

The present application claims priority from Japanese application JP 2006-248874 filed on Sep. 14, 2006, the content of which is hereby incorporated by reference into this application.

FIELD OF THE INVENTION

The present invention relates to a compact low power wireless terminal, and in particular, to a bidirectional data transmission technology in a sensor node forming a sensor network.

BACKGROUND OF THE INVENTION

A sensor network is a technology which has rapidly been attracting attention in recent years. By applying sensor network technology, sensing of information relating to the real world is performed in semi-real time, and this can be incorporated into an IT system as electronic information. Various applications are now being devised, and are expected to become next-generation IT techniques to support the coming ubiquitous society.

A key device in a sensor network is a wireless sensor node characterized by its compactness and low power consumption. Since it is compact, it can be attached to all manner of things including the environment and human beings, and since it is low-power, it can be operated for several years by battery without an external power supply. Further, since it communicates by wireless, it can be widely distributed over a wide area in combination with base stations or relay nodes.

A characteristic function of the sensor node is intermittent operation. This means that the only required hardware portion is driven when tasks such as sensing or data transmission are to be performed, and when there are no tasks to be performed, peripheral hardware such as sensors and RF are completely shut down, and a microprocessor is also put on standby in a low-power mode. By performing intermittent operation, prolonged operation of the sensor node is attained with limited battery resources.

In a sensor node which performs the aforesaid intermittent operation, the more the low-power consumption performance improves, the more the proportion of sleep time increases, so the sensor can receive data only during a very short waking time between sleep periods. How to transmit data efficiently in a compact, low-power sensor node which performs intermittent operation has an important effect on the performance of the system. In regard to this, a technique is disclosed where, for example, a sleep timing is controlled by a transmitting terminal which notifies a receiving terminal of the estimated time when data is to be transmitted on the next occasion (e.g., JP-A 2004-3 20153).

SUMMARY OF THE INVENTION

However, in the aforesaid method disclosed in JP-A 2004-320153, the higher precision is required in the time synchronization between the transmitting terminal and receiving terminal, the shorter the waking time of the receiving terminal is. This leads to increased difficulty of technique, or to increased cost of hardware. Since data addressed to a receiving station (for example, a command which instructs instant execution of sensing) may generate any timing for the sake of convenience of an application user and a system manager, even if the data transmission timing on the next occasion is specified, there is no guarantee that data addressed to the sensor will actually be generated at that time. Therefore, data is not necessarily sent at the preplanned timing, and efficient data transmission is difficult.

Moreover, unlike JP-A 2004-320153, instead of controlling the sleep time, it is also possible to perform polling during the sensor node waking time, and acquire data addressed to oneself spontaneously. However, in this method, if it is attempted to send plural data to the sensor node, the sensor node enters the sleep state each time transmission of data is complete, and as a result, data can only be sent during each intermittent operation period of the sensor. This means that it takes too much time to complete transmission of all the data, and a practical response time of the system cannot be obtained.

This invention was conceived in view of the aforesaid problems. It is therefore an object of the invention to provide a technique which transmits data addressed to a sensor node more efficiently, while maintaining the low power consumption performance of a sensor node.

Some typical inventions disclosed in the present application are as follows. The essential feature of the invention is that the transmitting node transmits data indicating start of plural-data transmission before transmitting the plural data.

Specifically, this consists of a server having a storage unit holding data address to the sensor node, and a transceiver which performs send/receive of data to and from the base station.

There is also an intermediate device which is connected to the server, and is connected to the aforesaid sensor node by wireless.

The sensor network system has a sensor terminal which is connected to the intermediate device by the transceiver, and performs repeated intermittent operation including an operating period when power is supplied to a processor, and a sleep period when power is not supplied.

The server, when continuous plural data is stored in the storage unit, transmits a first plural-data transmit start message via the transceiver, while the sensor terminal which received the transmit start message via the intermediate device, changes over the sleep period to a shorter predetermined period, and subsequently polls the intermediate device after a predetermined time has elapsed. When the server receives the aforesaid polling from the sensor terminal via the intermediate device, the server sends out the plural data via the transmitter, and transmits a plural-data transmit end message when transmission of the plural data is completed.

Therefore, the present invention can simultaneously enhance the response performance when plural data is transmitted to a sensor node which usually has a long sleep time, while maintaining the low power consumption performance of the sensor node.

BRIEF DESCRIPTION OF THE DRAWINGS

FIG. 13 is likewise a state transition diagram of a Bulk-Transfer Controller in the Command Manager; and FIG. 14 is likewise a schematic diagram of a node management table managed by a PAN Manager in the Middleware Server.

DETAILED DESCRIPTION OF THE PREFERRED EMBODIMENTS

One embodiment of the invention will now be described referring to the attached drawings.

Figure 4:
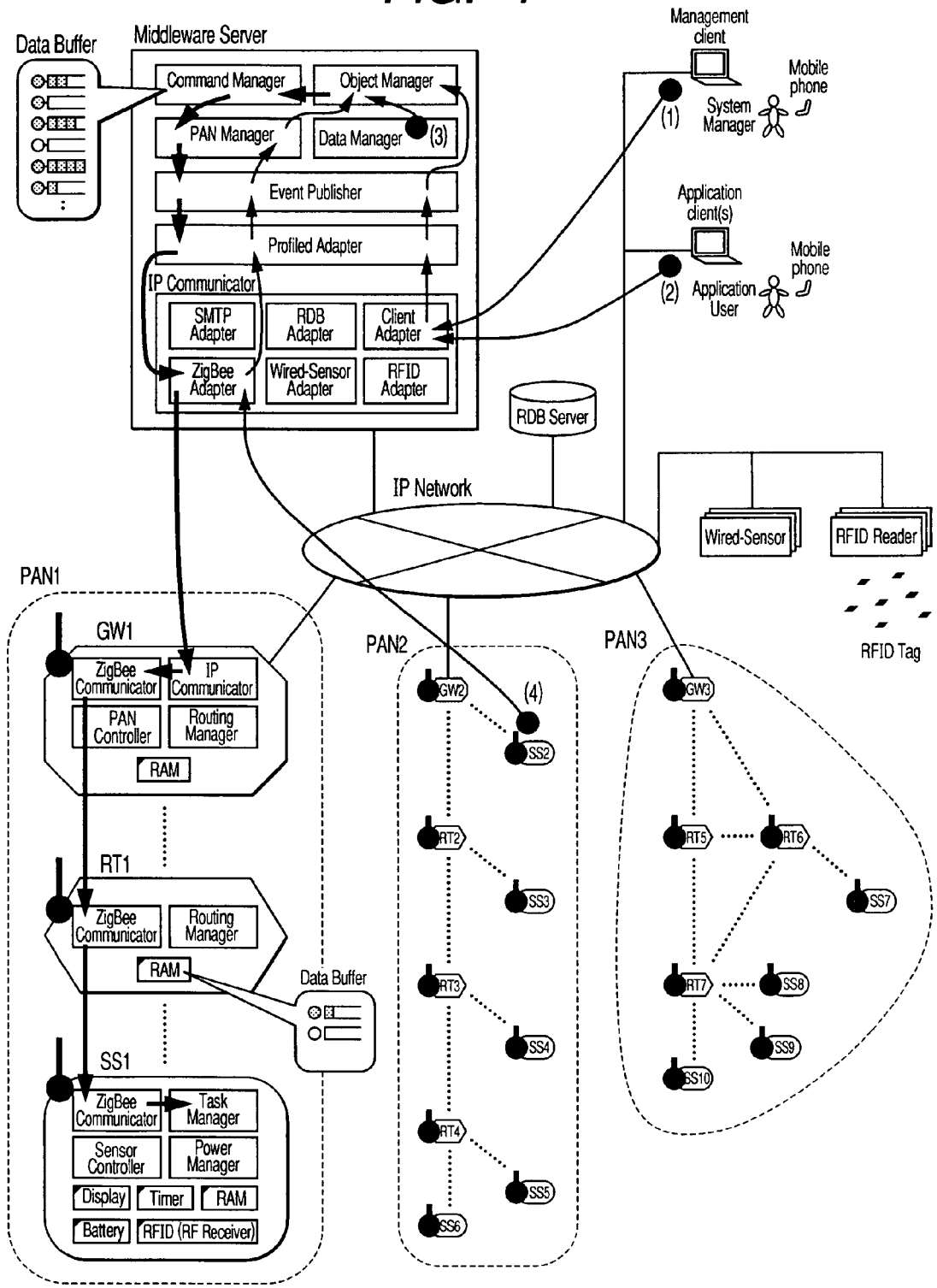
FIG. 4 is a schematic diagram of the whole system according to one embodiment of the invention.

FIG. 4: Overall View of System

FIG. 4 is an overall schematic view showing an example of a sensor network system which is a major application of the invention. Examples of industrial application of the invention are air-conditioning management of a whole building, monitoring of manufacturing steps in a factory, detection of toxic gases or fires, or noise management around trunk roads or factory sites.

Figure 5:
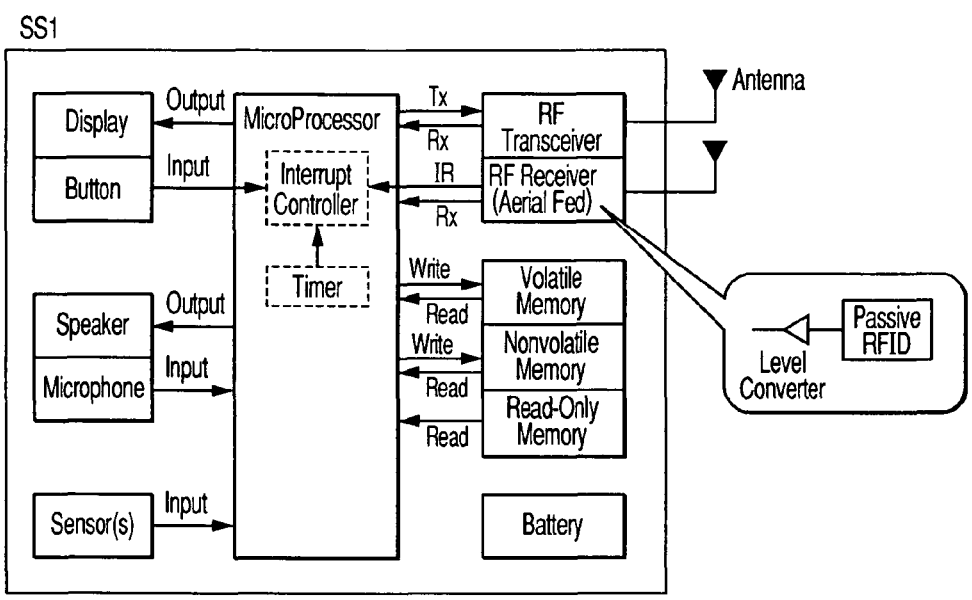
FIG. 5 is likewise a hardware schematic diagram of a sensor node SS1.

FIG. 5: Sensor Node SS1

FIG. 5 is a view showing a modification of the hardware of the sensor node SS1. The battery is a device for supplying power to each hardware unit of the sensor node SS1. A self-power generation device like an ordinary primary cell, a rechargeable battery which can be charged, a solar cell or an oscillating generator, can be used.

Figure 8:
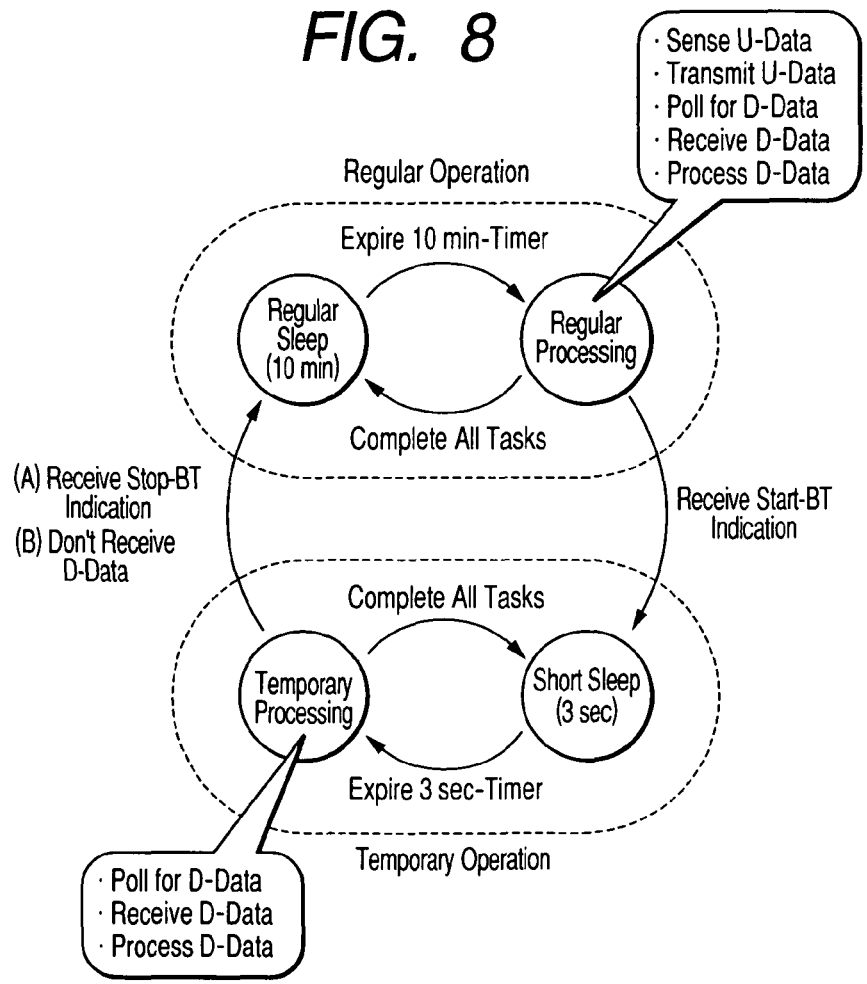
FIG. 8 is likewise a state transition diagram of the sensor node SS1.
Figure 9:
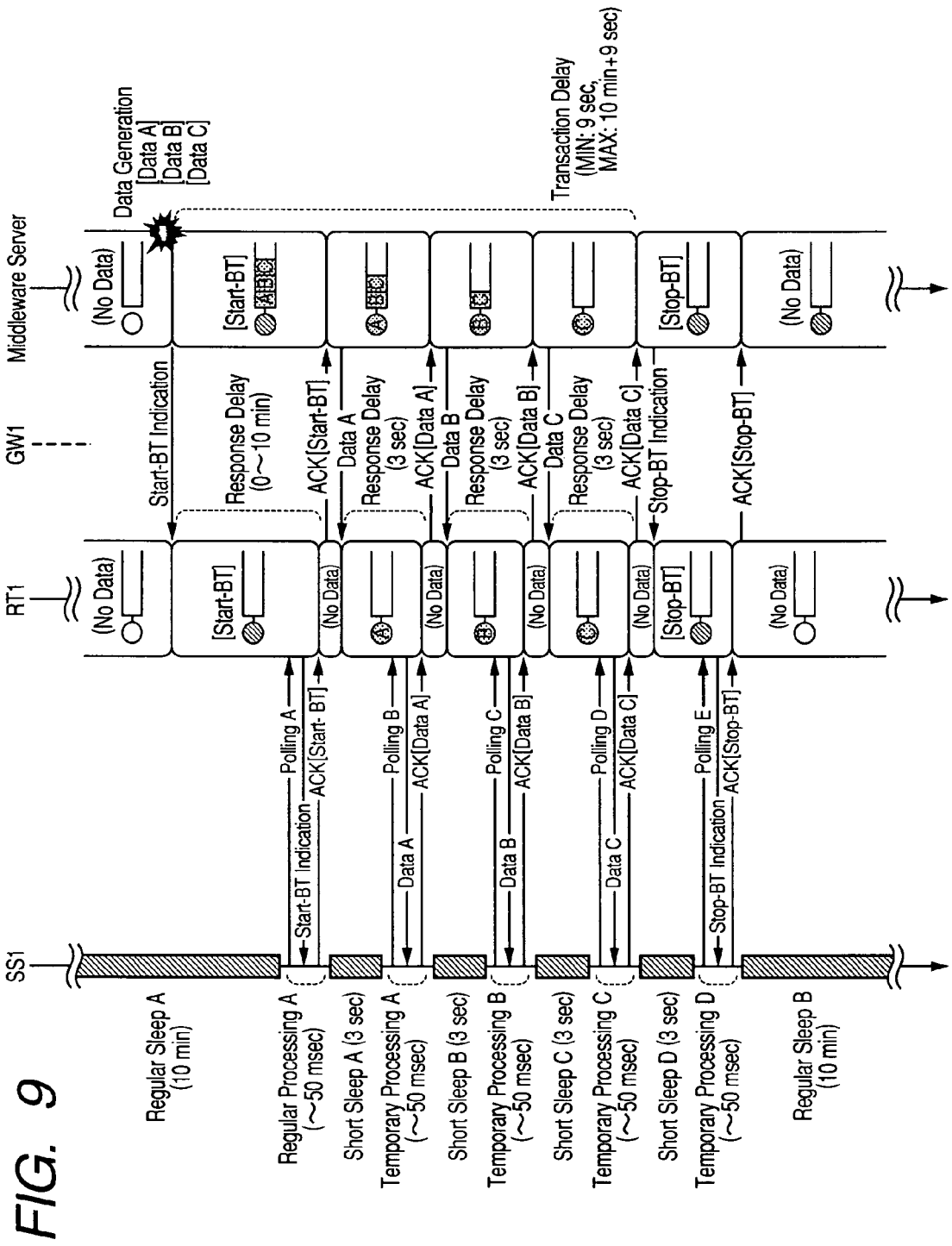
FIG. 9 is likewise a sequence diagram showing operation when sending plural data sequentially to the sensor node SS1.
Figure 10:
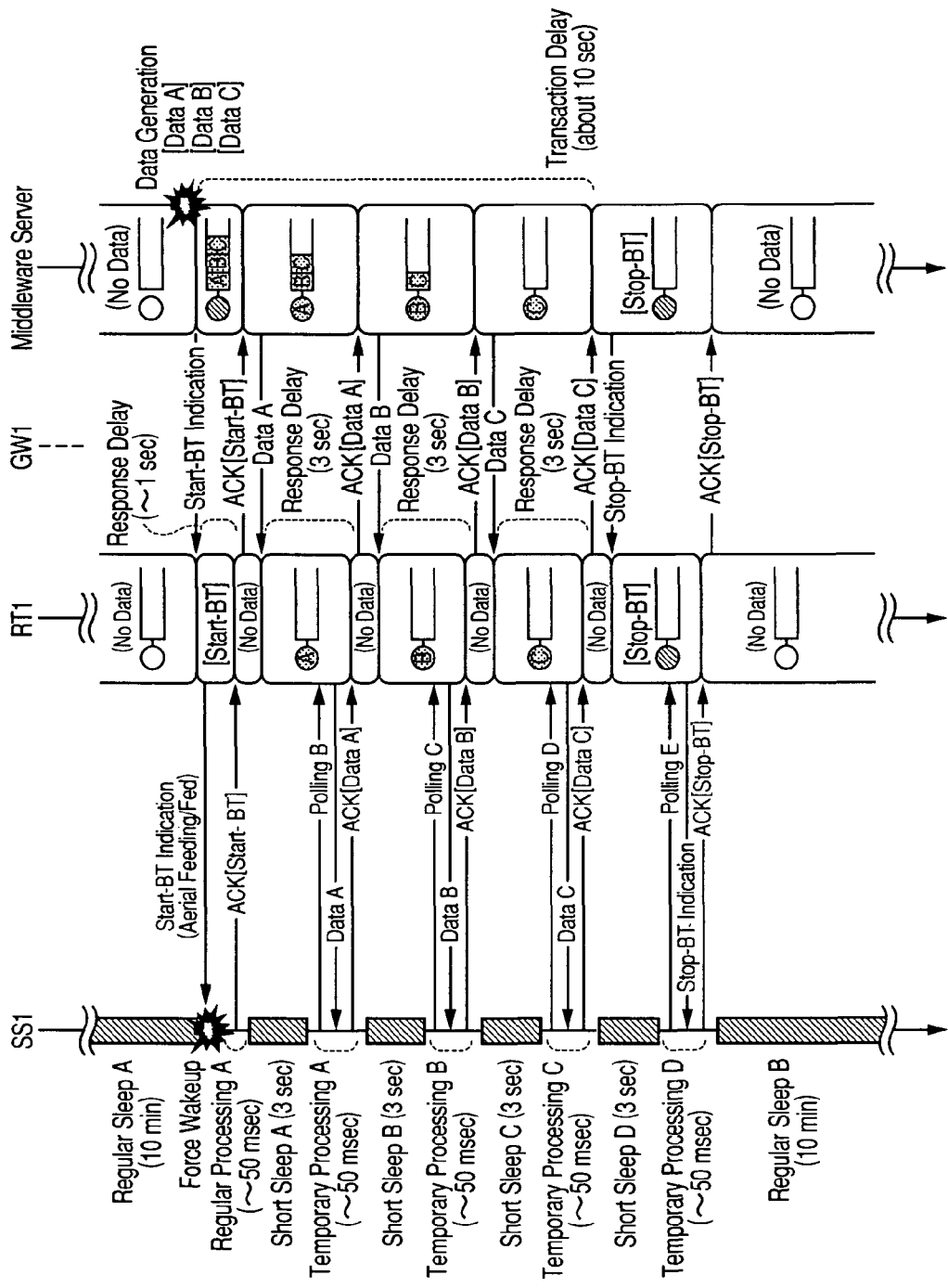
FIG. 10 is likewise a sequence diagram showing operation when forcibly waking the sensor node SS1, and sending plural data sequentially.

A MicroProcessor controls the overall operation of the sensor node SS1. By reading and executing a program code from the ROM Read-Only Memory described below, operation of the sensor node SS1 based on the invention is performed as shown in FIG. 8, FIG. 9 and FIG. 10.

An Interrupt Controller and a Timer are mentioned as functional units in the MicroProcessor which play an essential role in the invention. The Interrupt Controller is a functional unit which executes a function known as a hardware interrupt, and if an interruption signal from a surrounding functional unit is received, it can start a corresponding program code in real time.

The Timer is a functional unit for measuring time, and if a specified time passes, it can generate an interrupt signal. In the invention, power supply to all the functional units other than the interrupt controller Interrupt Controller and Timer can be stopped during the sleep period, and power supply to the whole MicroProcessor is resumed when the interrupt controller Interrupt Controller receives an interrupt signal which is generated periodically by the Timer.

The memory of the sensor node SS1 consists of a Volatile Memory, Nonvolatile Memory and Read-Only Memory. The Volatile Memory is a memory for storing run time data temporarily, and for example has a buffer region which holds a packet during transmit/receive. Since the Volatile Memory holds data only during a period when power is supplied, when power supply from the unit battery stops or power-on reset occurs, data currently held until then is lost. This can be considered to be a static random access memory or a dynamic random access memory.

On the other hand, the Nonvolatile Memory continues holding data once written even if power supply is lost, and is used for holding data which should be held for a long period of time during operation. For example, when the wireless conditions are poor and sensing data cannot be transmitted for a long period of time, it can be used for holding measurement data for tens of times or hundreds of times. Moreover, it can be set only once at the beginning of operation, and can hold random parameters such as those which continue operation at the same values for long periods, e.g., parameters such as sensing cycles or the like. This may be considered to be, for example, an EEPROM or the like. Since the Nonvolatile Memory does not require a power supply except for read/write, when data is held for a long period of time, power consumption is less than with the Volatile Memory. It has the advantage that data is not lost even when batteries are replaced or power-on reset occurs. On the other hand, during manufacturing steps and maintenance steps, the Read-Only Memory permits writing and updating of data, but during operation it is a storage area used exclusively for data read which contains program codes and fixed operating parameters. This may be considered to be, for example, a flash ROM or the like.

The wireless unit includes a RF Transceiver and RF Receiver (Aerial Fed). The RF Transceiver is used to transmit and receive normal data packets. In addition to having a data receiving unit function, the RF Receiver (Aerial Fed) is a circuit having an RF power supply function based on a principle such as electromagnetic induction, and it can receive data of a predetermined frequency band without receiving power supply from a battery. As a specific example of the RF Receiver (Aerial Fed), it may as shown in the drawings have a construction using a Passive RFID and Level Converter. When the RF Receiver (Aerial Fed) receives data, first, the Interrupt Controller will be interrupted and a signal IR will be inputted. Hence, even if the MicroProcessor was in the sleep state, it can return to normal operation promptly, and it can read received data.

A manual operation Button is an input device which receives a user operation, and by means of a specific button operation, a specific operation of the sensor node SS1 can be started, or an operating parameter can be set. Since a signal from the Button is inputted into the Interrupt Controller, even when the MicroProcessor is in the sleep state, processing corresponding to button operation is started in real time.

The display unit Display is a power device for displaying data to the user. For example, when the sensor node SS1 is installed inside a room or outdoors for environmental measurement, the latest measured value measured by the Sensor(s) can be displayed. In this case, for the purpose of power saving, nothing is displayed, and only when a specific button operation is performed, is the latest measured value displayed. When the sensor node SS1 is a name tag type or wrist watch type of personal digital assistant, a time entry is usually displayed, when a text message is received from a Middleware Server, this message is displayed, and when a voice message is received, this received information is displayed. Also, a hierarchical operation menu can be displayed when a user button operation is performed. By performing button operation according to this operation menu, an Application User and System Manager can set up sensor node operation parameters, or can check error information when there is a communication failure.

The Sensor(s) is a device for measuring the state of a target. Specifically, a small sensor device for measuring a physical quantity, such as temperature, humidity, acceleration, vibration, and distortion, can be used. There is also a sensor device equipped with both a function for sending a signal, and a function to receive a signal such as an infrared photograph reflector.

A Microphone is a device for measuring speech, i.e., aerial vibration, among the sensor(s) Sensor. A Speaker is a device for outputting speech. The Microphone and Speaker, when the sensor node SS1 is a personal digital assistant such as a name tag type and a wrist watch type, can be used to send and receive voice messages to application terminals in other sensor nodes or personal computers (Application Client(s) in FIG. 4).

The correspondence relation of each hardware functional unit shown in this diagram, and the functional composition of the sensor node SS1 shown in FIG. 4, will now be described.

The five functional blocks with a black mark in the left upper corner shown in the lower half of the sensor node SS1 in FIG. 4 have been specially selected as performing special roles in the present invention among the hardware functional units shown in FIG. 5. Due to space limitations in FIG. 4, the Volatile Memory in FIG. 5 is written as RAM in FIG. 4, and the RF Receiver in FIG. 5 (Aerial Fed) is written as RFID (RF Receiver) in FIG. 4.

Also, the four functional units shown in the upper half of the sensor node SS1 in FIG. 4 each represent a software function. In connection with FIG. 5, this is stored in the Read-Only Memory in the form of a program code, and during operation, is read and executed by the MicroProcessor. These run time data are held in the Volatile Memory or Nonvolatile Memory. The functional details of these software units will be described later.

Figure 6:
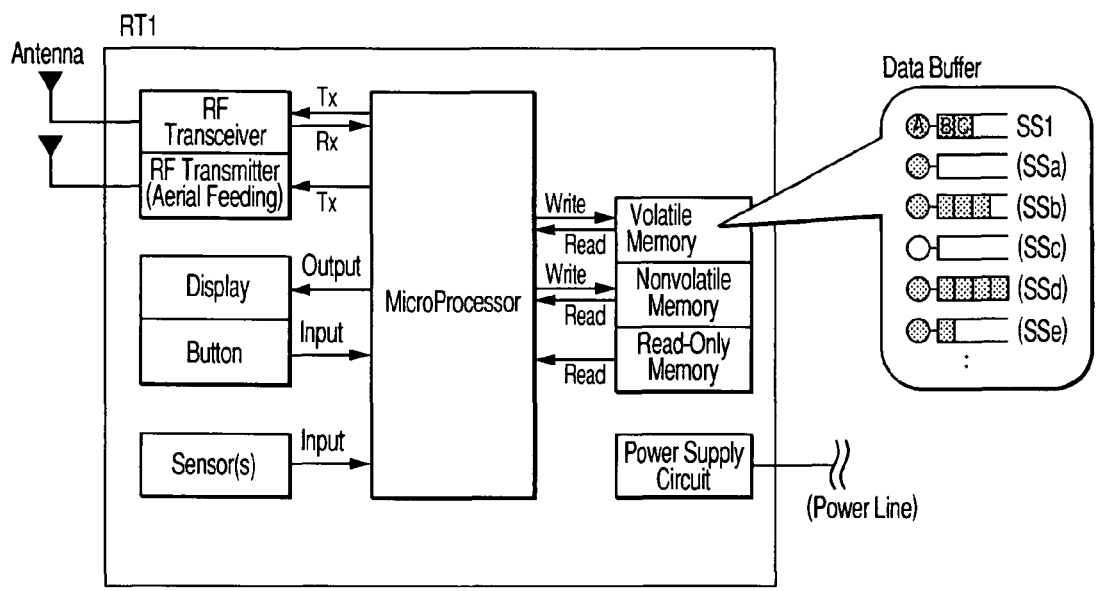
FIG. 6 is likewise a hardware schematic diagram of a router node RT1.

FIG. 6: Router Node RT1

FIG. 6 is a drawing showing the hardware construction of the router node RT1. Since the router node RT1 must always be ready to accept data from the sensor node SS1 or gateway node GW1 although it is not known when it will be transmitted, unlike the sensor node SS1, it operates not by a battery but by an external power supply. The power supplied from a Power Line is supplied to each functional unit, after a Power Supply Circuit performs rectification, etc.

Since there is no need to be concerned about power consumption, the microprocessor does not need to enter a sleep state as with the sensor node SS1.

Hence, the Interrupt Controller and Timer are omitted in the drawings, but these functions are utilized within the limits of a general data transmit/receive algorithm.

The wireless communications unit includes a RF Transceiver and RF Transmitter (Aerial Feeding). The RF Transceiver is used for transmission and reception of normal data packets as in the case of the sensor node SS1. The RF Transmitter (Aerial Feeding) has the same circuit as an RFID reader provided with a wireless power supply function based on a principle such as electromagnetic induction, in addition to a data transmission function. Data transmitted from the RF Transmitter (Aerial Feeding) can be received by the RF Receiver (Aerial Fed) even if the sensor node SS1 is in the sleep state.

The Router Node RT1 has a data buffer for buffering at least one data for each sensor node under its control in the Volatile Memory or Nonvolatile Memory. In the case of the router node RT1, the only sensor node under its control is the sensor node SS1, but since, for example, for the router node RT4 there are two sensor nodes under its control, and for the router node RT7 there are three sensor nodes under its control, the Data Buffer is independently managed for each sensor node. In addition, as the physical implementation of the Data Buffer, a memory region which is physically independent for each sensor node may be allocated, or even if the data for all sensor nodes is stored in a common memory region, it may be managed by matching identifying information showing the sensor node to which the data is addressed, and identifying information showing the transmission order between different data with the same address. Whichever of the above implementations is used, the Data Buffer actually plays the role of a table which manages a list of sensor nodes under its control. However, the list of sensor nodes under its control is data which is frequently referred to other than for the actual purpose of the Data Buffer, which is buffering downstream data. For example, the router node RT4 has the sensor nodes SS5, SS6 under its control, so it must reliably perform processing such as forwarding data sent by these nodes. On the other hand, if it receives data sent by the sensor node SS4 which happens to be in the vicinity although not under its control, from the viewpoint of economizing communication bandwidth and security protection, the router RT4 should not forward this data. Hence, in order to determine whether or not to process a packet which is received, the list of sensor nodes under its control is frequently referred to. In a considerable embodiment, it is also possible to have a situation wherein this list information is managed as a table independent of the data buffer, in order to increase referencing speed and separate upstream data-processing from downstream data-processing.

In addition, as in the case of the Display, Button and Sensor(s), an input/output device equivalent to the sensor node SS1 may also be provided.

The correspondence relation of each hardware functional unit shown in this diagram and the functional composition of the router node RT1 shown in FIG. 4, will now be described. The functional block denoted by RAM in the lower part of the router node RT1 in FIG. 4, shows a volatile memory which plays the most characteristic role of the present invention among the various hardware functional units shown in FIG. 6. Moreover, the two functional units shown in the upper part of the router node RT1 in FIG. 4 respectively represent software functions. In connection with FIG. 6, they are stored in the Read-Only Memory in the form of a program code, and during operation, are read and executed by the MicroProcessor. These run time data are held in the Volatile Memory or Nonvolatile Memory. The detailed functions of these software functional units will be described later.

Figure 7:
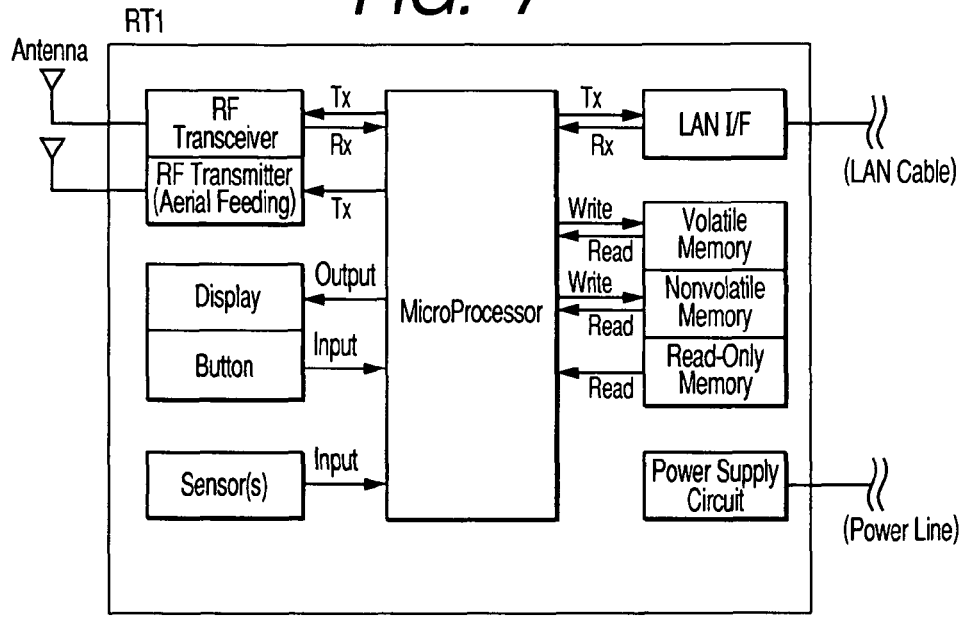
FIG. 7 is likewise a hardware schematic diagram of a gateway node GW1.

FIG. 7: Gateway Node GW1

FIG. 7 is a drawing showing the hardware construction of the gateway node GW1. The Gateway node GW1 has the same construction as the router node RT1 except for having a LAN communication interface LAN I/F for communicating with the Middleware Server via an IP Network. The Gateway node GW1 has all the same functions as the router node RT1, i.e., a function wherein it is a parent of one or more sensor nodes, as shown by GW2 in FIG. 4. Therefore, when the gateway node GW1 has a sensor node under its control, as in the case shown in FIG. 6, it can hold a Data Buffer for buffering at least one data for each sensor node under its control in the Volatile Memory or Nonvolatile Memory.

The correspondence relation of each hardware functional unit shown in this diagram and the functional composition of the gateway node GW1 shown in the diagram will now be described.

The functional block denoted by RAM in the lower unit of the gateway node GW1 in FIG. 4 shows a Volatile Memory which has the most characteristic feature in the invention among the hardware functional units shown in FIG. 7.

Also, four functional units shown in the upper part of the gateway node GW1 in FIG. 4 each represent a software function. In connection with FIG. 7, this is stored in the Read-Only Memory in the form of a program code, and during operation, is read and executed by the MicroProcessor. These runtime data are held in the Volatile Memory or Nonvolatile Memory. The functional details of the software functional units will be described later.

Regarding the hardware construction of the Middleware Server, an ordinary PC server or a workstation provided with a LAN communication interface may be used, but this is not shown in the drawing. FIG. 4 shows the software construction of the middleware server Middleware Server.

The Data Manager is a functional unit which manages measurement data collected by the sensor node by associating it with device positions and semantic information. By accessing this functional unit, the Application User can access semantic information on "the temperature background on August 1 in the refrigeration room A where food is stored".

The Object Manager is a functional unit which manages identifying information used as sensor or measurement data which becomes the semantic information managed by the Data Manager. For example, as described later in FIG. 14, it provides a function such that a table for uniquely identifying the sensor node SS1 in the system is created and managed, respective measurement data are managed by specific identifying information, and measurement data for plural sensor nodes installed in the refrigerator A are converted to tables.

The Command Manager is a functional unit which, when the Middleware Server transmits downstream data addressed to the sensor node, controls this data transmission. This downstream data, apart from "installation commands" which set operating parameters of the sensor nodes, also includes voice messages directed to terminal type sensor nodes provided with a speaker. However, in a communications network where upstream communication accounts for most of the traffic, the downstream data may be "commands" in general regardless of their specific content. The "Command Manager" is also named according to general practice.

A PAN Manager is a functional unit which holds and manages a node management table described in FIG. 14 as information about the wireless network referred to as a PAN (Personal Area Network), and adds information obtained from this table to the downstream data delivered by the Command Manager.

The Event Publisher is a functional unit which distributes all the data sent and received by the Middleware Server, to the corresponding processor.

A Profiled Adapter is a functional unit which converts all the data sent and received by the Middleware Server between the data format in the Middleware Server and the particular data format of each communications partner.

An IP Communicator is a general term for a functional unit executing the particular communications protocol of each communication partner when the Middleware Server communicates with each communication facility via a LAN communication interface, and includes an individual protocol adapter. Six typical protocol adapters are shown in the diagram. A ZigBee Adapter is an adapter for communicating with the gateway nodes GW1-GW3. A Client Adapter is an adapter for communicating with the Management Client and the Application Client(s). A Wired-Sensor Adapter is an adapter for communicating with a Wired-Sensor connected via a cable network.

An RDB Adapter is an adapter for communicating with a RDB Server for holding sensing data history over a long period. An SMTP Adapter is an adapter for notifying critical information in the form of E-mail to the System Manager or Mobile Phone of the Application User. A RFID Adapter is an adapter for acquiring information about a RFID Tag via the RFID Reader.

The arrows in FIG. 4 show the data flow of the invention when the sensor node SS1 is a destination. Among these, the starting point of each arrow group shown by (1)-(4) is a device or functional block which is a transmission source of plural data.

The arrow shown by (1) shows the case where the Management Client operated by the System Manager is the transmission source of plural data.

As an example of such plural data, when the sensor node SS1 is first installed on site, the initial setting of plural run time parameters, such as intermittent operating cycle, communication route and the number of resends, may be performed in one operation or interactively.

The arrow shown by (2) shows the case where the Application Client(s) operated by the Application User is a transmission source of plural data.

As an example of such plural data, the sensor node SS1 may be for example a personal digital assistant, where the Application User transmits a voice message to the sensor node SS1 via the Application Client(s). High volume data like a voice message is usually sent continuously, after being divided into plural packets.

The arrow shown by (3) shows the case where the Data Manager in the Middleware Server is a transmission source of plural data. As an example of such plural data, there may be the case where, when a poor communications environment continues, and several tens or several hundreds of the data measured by the sensor node SS1 is not transmitted to the middleware server, recovery of measurement data is performed actively from the Middleware Server side.

The arrow shown by (4) shows the case where another sensor node, here the sensor node SS2, is a transmission source of plural data. As an example of such plural data, the case may be mentioned where the sensor nodes SS1, SS2 are, for example, personal digital assistants, and a voice message is transmitted from the sensor node SS2 to the sensor node SS1.

The data issued from each starting point (1)-(4) is delivered along each arrow, and comes together in the position of Object Manager. Subsequently, in accordance with the common route shown by the thick arrow, it is delivered to the Task Manager in the sensor node SS1.

An ACK is returned to each starting point by following a route opposite to that shown by the arrows. Generally, an ACK is a packet returned by the receiver to the transmitter in order to show delivery of data, and it is a packet including the same data identifying information as the data for which an ACK is given referred to as a sequence number. On the other hand, a return ACK is not just a delivery check, but an ACK by which a certain processing (sensing processing and operating parameter change) is started on reception of this data, and it includes information showing the result (success or failure). In the invention, since there is no difference essential to the processing program in either case, both an ordinary ACK and a return ACK will be referred to by the general name ACK.

In the system configuration shown in FIG. 4, the characteristic operating sequence of the invention refers to the sequence when downstream data is delivered to the sensor node SS1 while being transferred by start/stop synchronization between the Data Buffer holding the Command Manager in the Middleware Server, and the Data Buffer reserved in the RAM of the Router Node RT1, i.e., the Volatile Memory. The details of the Data Buffer in the Router Node RT1 have already been described in FIG. 6. The Data Buffer held by the Command Manager will be described later in FIG. 11. The procedure of start/stop synchronization data transmission and reception between the two Data Buffers, will be described later in FIG. 9.

Figure 1B:
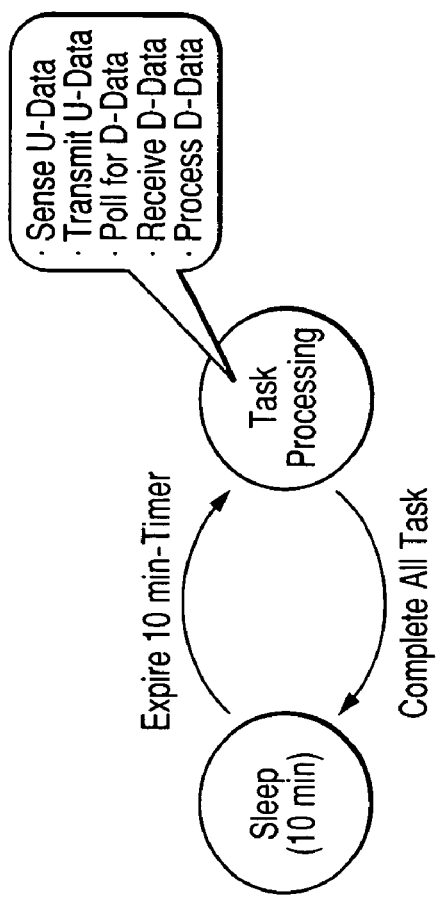
FIG. 1 is a sequence diagram showing intermittent operation of a sensor node, and its state transition diagram.
Figure 1A:
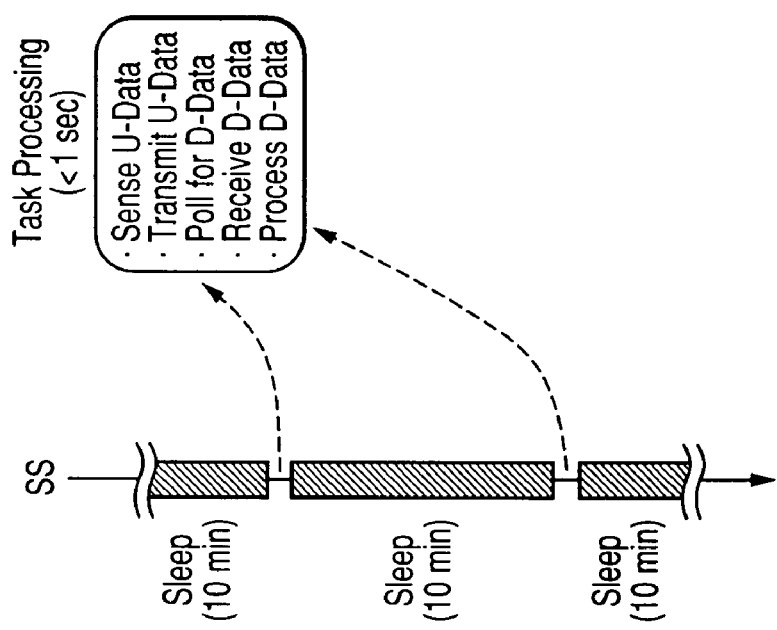

FIG. 1:

FIG. 1 shows a typical operation of a sensor node SS which performs intermittent operation. When there is a sensor node intermittent operation, FIG. 1A shows the operating cycle of the sensor node SS with the time axis taken along a downward perpendicular. FIG. 1B shows the same operation with a state transition diagram. The operation of the one-line notation given to the arrow in FIG. 1B represents an event which is a trigger of a state transition generated at the state of the starting point of the arrow. When the microcomputer completes a predetermined sleep time (10 minutes in the drawing), and the timer generates an interrupt, the microprocessor returns to the normal operation mode. According to a predetermined procedure, sensing is then performed, the sensed data is transmitted, and if there is self-addressed data, it is received by polling and the data is processed. When all the tasks which have to be performed at that time are completed, the microprocessor again enters the sleep state for a predetermined time. Since the length of the task processing period between sleep periods is of the order of several 10 ms to 1 second at most, the sensor node is in the sleep state for most of the time. Since the fundamental characteristic of intermittent operation is "sleep when it is not required to perform tasks", various modifications of the way in which intermittent operation is performed by task scheduling can be envisaged.

For example, when the sensor node has plural sensors, there may be a separate sensing cycle for each sensor. Also, since sensing, data transmit and data receive are basically independent tasks, each task may have separate operating cycles.

Here, in data receive during sensing when intermittent operation is performed, it is effective for the transmitting source to regularly check whether or not there is self-addressed data by polling (polling method) from the viewpoint of low power consumption and the fact that it is not necessary to synchronize with upstream devices.

Since data is not transmitted in polling unless the sensor node itself polls, the sensor node can sleep according to its own intermittent operating cycle, and can acquire data at a timing which is self-convenient. In addition, since complicated control such as timing synchronization is unnecessary and it easy to install even a microprocessor with low resources, it is very suitable as a data receive method for the sensor node. In the case of polling, an enquiry is sent to the transmitting side even when there is no data, but in the case of ZigBee and IEEE802.15.4 which are wireless communications methods, the power consumption during transmit and receive are is approximately the same, and the total time of sending an enquiry packet and receiving an ACK during polling is of the order of 1 ms. Therefore, increase of power consumption is very slight.

Figure 2:
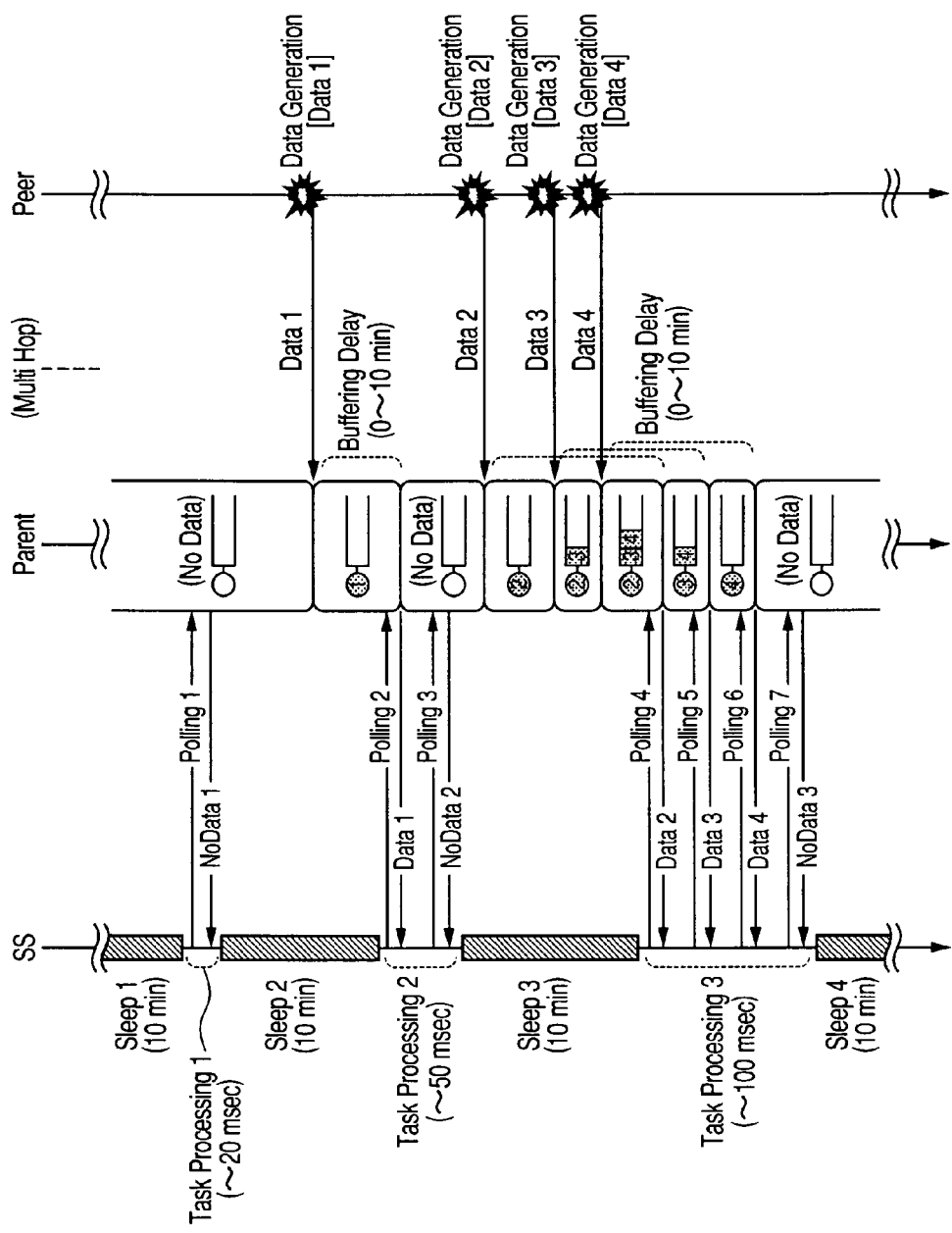
FIG. 2 is a sequence diagram showing data receive operation by polling of the sensor node.

Next, the data receive operation in a sensor node provided with the intermittent operation method and polling method of the present application, will be described. FIG. 2 is a drawing describing a data receive operation in a sensor node SS which performs intermittent operation as shown in FIG. 1.

In addition, for the sake of convenience in writing, operations of the sensor node other than sleep, polling and data receive are omitted.

It is assumed that the other node which performs communication directly with the sensor node SS is fixed, and this other node will be referred to as a parent node. In this assumption, communication between the sensor node SS and nodes other than the parent node must also go through the parent node. Moreover, the sensor node SS cannot have plural parent nodes simultaneously, and must implement a connection procedure (referred to as Association, Join, etc.) for the determination and modification of the parent node. Due to the above set of assumptions, the data transmit/receive procedure in the sensor node SS, parent node and communications partner can be kept simple.

Specifically, when the communications partner transmits data to the sensor node SS, it may be transmitted in a fixed way to a corresponding, specific parent node, and when the sensor node SS receives this data, polling may be performed in a fixed way to this parent node. Here, the parent node receives data addressed from the communications partner to the sensor node SS, and it performs control which buffers this data until the sensor node polls.

Now, in FIG. 2, the case where the sensor node SS performs intermittent operation with a cycle of 10 minutes is shown. First, if the sensor node SS returns from a sleep period "Sleep 1" and enters a task processing period "Task Processing 1," the sensor node SS performs a Polling 1 to the parent node. At this time, in the Parent, there is no data addressed to the sensor node SS, and the Parent returns an ACK NoData 1 signifying that such data does not exist to the sensor node SS. The sensor node SS which received this response promptly shifts to a sleep period "Sleep 2." Here, even if the length of the task processing period "Task Processing 1" includes sensing, transmission of sensing data and polling as a continuous set of operations, it is only of the order of several ms to 10 ms.

Next, while the sensor node SS is in the sleep period "Sleep 2," suppose that a communications partner "Peer" transmitted data "Data 1" addressed to the sensor node SS. This data "Data 1" is received by the parent node "Parent," and it is buffered in the communications partner "Peer" until the sensor node SS starts polling. Although single hop communication may be sufficient as the data delivery method between the communications partner "Peer" and the parent node "Parent," it is more generally multi-hop communication which passes through more than one router nodes. Subsequently, when the sensor node SS returns from the sleep period "Sleep 2" and enters the task processing period "Task Processing 2," the sensor node SS performs a polling "Polling 2" to the parent node "Parent." Since data "Data 1" addressed to the sensor node SS is buffered in the parent node "Parent" at this time, the parent node "Parent" forwards this data "Data 1" to the sensor node SS. In addition, although omitted in the drawing, the sensor node SS, after receiving this data "Data 1," performs processing according to the content of this data "Data 1." For example, when this data "Data 1" is a command to modify operating parameters, the sensor node SS changes its own operating parameters according to the instructions of this command. Moreover, when the sensor node SS is an information terminal type unit which a man attaches to his body and this data "Data 1" is a data unit which forms a voice message, the sensor node SS stores this data "Data 1" in a playback buffer, or performs playback processing.

Thus, after the sensor node SS receives this data "Data 1" and performs corresponding processing, the sensor node SS performs a polling "Polling 3" to the parent node "Parent" promptly once again. This is for checking whether or not further data is buffered by the Parent.

Since the data addressed to the sensor node SS is not buffered in the parent node "Parent" at this time, the parent node "Parent" returns a response "NoData 2" signifying that there is no data to the sensor node SS.

The sensor node SS which received this response promptly shifts to a sleep period "Sleep 3." Here, the length of the task processing period "Task Processing 2," compared to the length of the task processing period "Task Processing 2," is longer due to adding the processing time due to data "Data 1," but even in this case, it is only from 10 ms to about 50 ms, which is no more than an instant compared to 10 minutes which is the length of the sleep period.

Now, the time required from when data "Data 1" addressed to the sensor node SS is received from the communications partner "Peer" of the transmitting source, to when it is actually received by the sensor node SS, is determined by the length of the buffering period in the parent node "Parent."

This buffering period is determined by the timing of the polling cycle of the sensor node SS, and the time when the communications partner "Peer" transmits Data 1. In this example, since the polling cycle of the sensor node SS is 10 minutes, in the shortest case, this buffering time is 0 seconds, and, in the longest case, it is 10 minutes. The shortest timing is the case where the communications partner "Peer" transmits Data 1 just before the sensor node SS performs the polling "Polling 2."

The longest timing is the case where the communications partner "Peer" transmits Data 1 immediately after the sensor node SS performs the polling "Polling 1," or immediately after it performs the Polling 2.

Next, while the sensor node SS is in the sleep period "Sleep 3," suppose that the Peer transmitted plural data "Data 2, Data 3, Data 4" to the sensor node SS sequentially. These data are received by the parent node "Parent," buffered sequentially in the parent node "Parent," and managed by the FIFO method until the sensor node SS starts to poll. Subsequently, when the sensor node SS returns from the sleep period "Sleep 3" and enters the task processing period "Task Processing 3," the sensor node SS performs a polling "Polling 4" to the parent node "Parent." At this time, in the Parent, the plural data "Data 2, Data 3, Data 4" addressed to the sensor node SS are buffered, and the parent node "Parent" forwards a Data 2 buffered first according to the FIFO mode to the sensor node SS. After the sensor node SS receives this data "Data 1" and performs corresponding processing, the sensor node SS again promptly performs a polling "Polling 5" to the parent node "Parent." At this time, in the parent node "Parent," the two data "Data 3, Data 4" are buffered.

The parent node "Parent" forwards Data 3 buffered previously to the sensor node SS according to the FIFO mode.

After the sensor node SS receives this data "Data 3" and performs corresponding processing, the sensor node SS again promptly performs a polling "Polling 6" to the parent node "Parent." At this time, in the parent node "Parent," only Data 4 is buffered. The Parent forwards this Data 4 to the sensor node SS. After the sensor node SS receives this data "Data 4" and performs corresponding processing, the sensor node SS again promptly performs a polling "Polling 7" to the parent node "Parent." Since the data addressed to the sensor node SS is not buffered in the parent node "Parent" at this time, the parent node "Parent" returns a response "NoData 3" signifying that there is no data to the sensor node SS. The sensor node SS which received this response promptly shifts to the sleep period "Sleep 4." Here, although the length of the task processing period "Task Processing 3" is longer than the length of the task processing period "Task Processing 2" by the polling frequency and receive data number, it is of the order of several ms to 100 ms in all at the most, which is only an instant compared to 10 minutes which is the length of the sleep period.

Also, the time required for the plural data "Data 2, Data 3, Data 4" addressed to the sensor node SS to actually be received by the sensor node SS after being transmitted by the communications partner "Peer," as in the case of Data 1, is determined by the length of the buffering period in the parent node "Parent," and in the shortest case, this buffering time is 0 seconds, and, in the longest case, it is 10 minutes. For example, focusing on Data 2, the timing for which the buffering time is shortest, is the case where the communications partner "Peer" transmits Data 2 just before the sensor node SS performs the polling "Polling 4," and the timing for which it is the longest, is the case where the communications partner "Peer" transmits Data 2 immediately after the sensor node SS performs the polling "Polling 3," or immediately after it performs the polling "Polling 4."

Intermittent operation and polling are essential techniques to reduce power consumption and increase the lifetime of the sensor node. Even if a task which should be processed during sleep of the microprocessor arises, this task cannot be processed until the microprocessor returns to the normal operation mode. This is particularly frequent in connection with communication addressed to the sensor node during sleep (hereafter, "downstream communication").

Regarding communication transmitted by the sensor node itself (hereafter, "upstream communication"), although this is an intermittent operation, the sensor node can determine the transmission timing itself, so in principle there is no disadvantage.

However, regarding downstream communication, as shown in FIG. 2, data addressed to the sensor node (e.g., a command which instructs sensing to be performed), can arise with almost any timing as convenient for the application user or system manager regardless of the intermittent operation timing of the sensor node. When the polling interval of the sensor node during normal operation, i.e., the sleep time, exceeds several minutes, data generated with any timing cannot be expected to be delivered immediately. Even then, as in the case of sequential transmission of the plural data "Data 2, Data 3, Data 4" in FIG. 2, when the plural data are transmitted continuously, it is possible to deliver all the data already issued at that time to the destination sensor node by waiting one sleep period at most. However, plural data can be transmitted all at once only when the parent node "Parent" has sufficient memory capacity to buffer the plural data, and it is not necessary to verify transmission or processing results of the plural data sequentially. Unless these conditions are satisfied, the transmitting node must perform control to verify transmission or processing results of the data sequentially. In such a case, each time data transmission or processing results are verified, the sensor node enters the sleep period each time. As a result, the responsiveness of the sensor node to delivery of plural data largely declines, and it is not easy for the sensor node to be used interactively by the application user or system manager.

Figure 3:
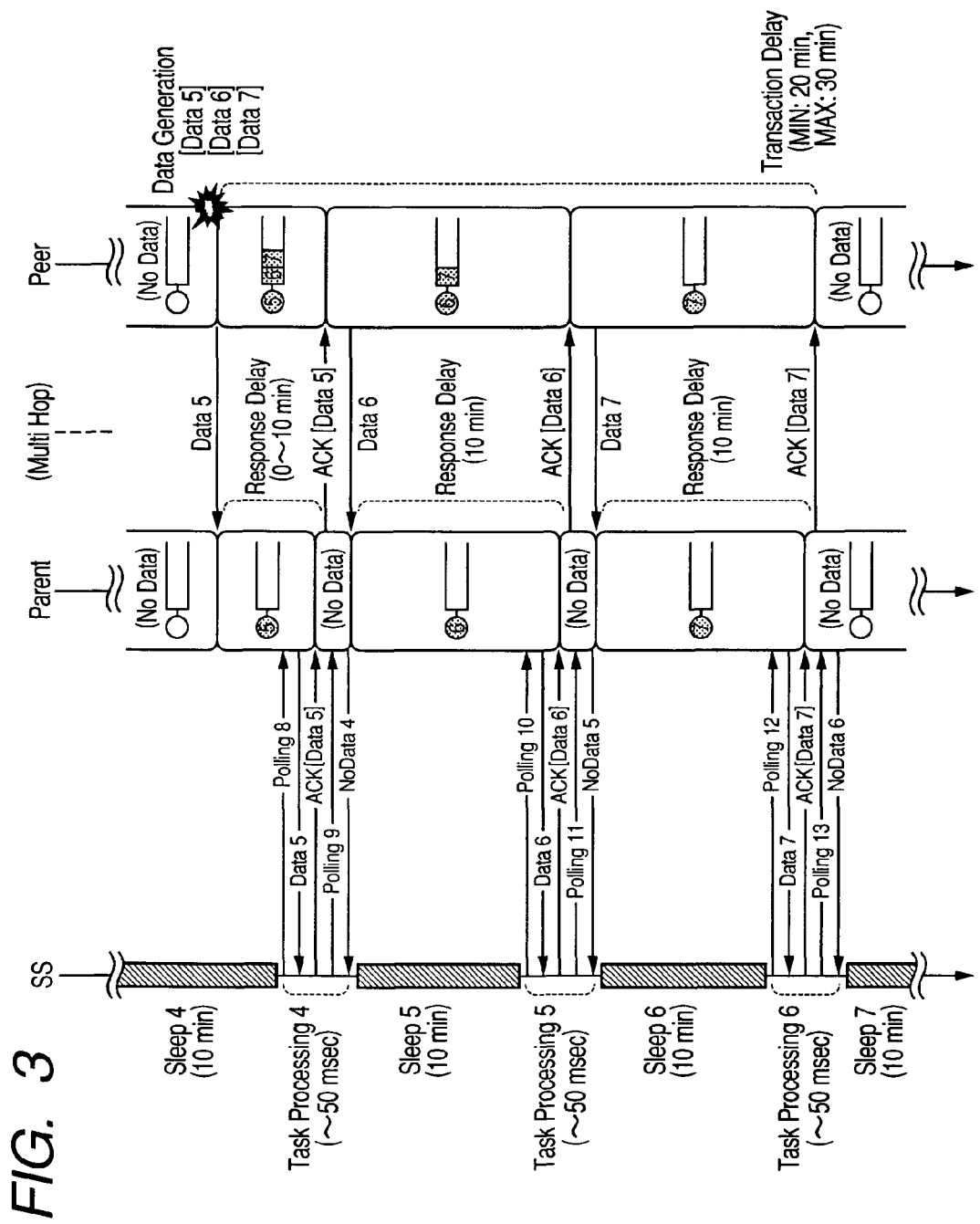
FIG. 3 is a sequence diagram showing operation at the time of sending plural data sequentially to the sensor node based on the prior art technique.

For example, FIG. 3 is a diagram which describes the operation when continuous plural data are delivered, in a situation where the parent node "Parent" can buffer only one of the data addressed to the sensor node SS. A situation wherein the parent node "Parent" can buffer only one of the data addressed to the sensor node SS, occurs when the memory capacity of the parent node "Parent" is small, and when there are a large number of sensor nodes connected to the parent node "Parent" compared to the memory capacity of the parent node "Parent," so that a sufficient buffering area cannot be reserved in each sensor node.

First, suppose that while the sensor node SS is in the sleep period "Sleep 4," continuous plural data "Data 5, Data 6, Data 7" are generated in the Peer. If the communications partner "Peer" transmits the plural data "Data 5, Data 6, Data 7" continuously at this time, the parent node "Parent" can buffer only one data. Hence, only Data 5 which arrived first will be accepted, and Data 6, Data 7 will disappear, or the buffer will be forcibly overwritten so that Data 5, Data 6 disappear. Therefore, the communications partner "Peer" cannot transmit data continuously, but must first transmit only Data 5, and must itself buffer Data 6, Data 7. The transmitted data "Data 5" is received by the parent node "Parent," and is buffered in the parent node "Parent" until the sensor node SS polls.

When the sensor node SS returns from the sleep period "Sleep 4" and enters the task processing period "Task Processing 4," the sensor node SS performs a polling "Polling 8" to the parent node "Parent," and receives Data 5. Here, the sensor node SS returns an acknowledgment "ACK [Data 5]" showing that Data 5 was received to the communications partner "Peer." The acknowledgment "ACK [Data 5]" is promptly delivered to the communications partner "Peer" via the parent node "Parent." When the communications partner "Peer" receives the acknowledgment "ACK," since it is guaranteed that the buffer of the Parent is empty, the communications partner "Peer" can promptly transmit the following Data 6 addressed to the sensor node SS. However, when Data 6 reaches the parent node "Parent," the sensor node SS has already received a response "NoData 4" showing that there is no data as a result of a polling "Polling 9," after shifting to the sleep period "Sleep 5." Therefore, Data 6 is buffered in the parent node "Parent" until the sensor node SS returns from the sleep period "Sleep 5." As a result, Data 6 is not sent to the sensor node SS until a polling "Polling 10" in the next task processing period "Task Processing 5," and until the communications partner "Peer" receives a corresponding acknowledgment "ACK [Data 6]" after transmitting Data 6, a response delay of 10 minutes which is substantially identical to the sleep interval of the sensor node SS, is required.

This is identical for Data 7 which is transmitted after the communications partner "Peer" receives the acknowledgment "ACK [Data 6]", so it is buffered for 10 minutes in the parent node "Parent," and a response delay of 10 minutes is required until delivery verification is completed by an "ACK [Data 7]". As a result, the transaction delay until the communications partner "Peer" has received the three continuous data "Data 5, Data 6, Data 7," since the response delay for Data 6, Data 7 is fixed at 10 minutes each, is at least 20 minutes, and since the response delay for Data 5 is also 10 minutes in the worst case, the worst value of the transaction delay is 30 minutes.

Hence, in a state wherein the parent node "Parent" can buffer only one of the data addressed to the sensor node SS, the communications partner "Peer" has to perform sequential transmission by waiting for an ACK to each data in order to prevent a buffer overflow in the parent node "Parent," but since the sensor node SS has already shifted to the sleep period when the communications partner "Peer" transmits the following data after it receives the ACK, there is a problem for example that even if the communications partner "Peer" generated continuous plural data, it can send only one data at a time for each cycle of intermittent operation of the sensor node SS. Hence, the response in the case of having to transmit a large amount of data to the sensor node SS is very poor, and it is difficult to construct a practical system.

Here, a compensation when Data 6 reaches the parent node "Parent," and the sensor node SS has already shifted to the sleep period "Sleep 5," will be described.

Since the sensor node SS has a strong need to reduce power consumption, it needs to terminate the task processing period "Task Processing 4" as soon as possible.

Specifically, it is expected that the time required for the task processing period "Task Processing 4" will be about 50 ms at most. Therefore, the sensor node SS, after transmitting the acknowledgment "ACK [Data 5]", must perform the polling "Polling 9" promptly without putting in excessive waiting time.

On the other hand, the time required after the acknowledgment "ACK [Data 5]" transmitted from the sensor node SS is forwarded by the parent node "Parent" and received by the communications partner "Peer," until the communications partner "Peer" transmits Data 6 and the parent node "Parent" receives it, is at least several times more than the time required until the polling "Polling 9" of the sensor node SS is received by the Parent, even by a conservative estimate. In particular, when there is multi-hop communication between the parent node "Parent" and the communications partner "Peer," the required time is of the order of seconds. Even assuming that there is some mitigation of the low-power requirement in the sensor node SS, and an option is permitted which allows some waiting time until the execution of the polling "Polling 9," the introduction of a waiting time of the order of seconds has a considerably adverse effect on the low-power characteristics of the sensor node SS. Moreover, it is technically difficult to shorten the data roundtrip time between the parent node "Parent" and the communications partner "Peer." Since the low power characteristics of the sensor node SS are considered to be important, the sensor node SS must execute the polling "Polling 9," and since there is almost no possibility that Data 6 has reached the Parent at that time, reception of Data 6 will be carried over into the following task processing period "Task Processing 5."

In FIG. 3, the case was described where the parent node "Parent" could only buffer one of the data addressed to the sensor node SS. In this case, in order to prevent buffer overflow in the parent node "Parent," the communications partner "Peer" had to perform sequential transmission by waiting for an ACK to each data. However, this is not the only situation where the Peer must perform sequential transmission of plural data. For example, in general, wireless communications has a much higher rate than cable communications, so there are very many prior art techniques which require receiving an ACK to each data in order to ensure reliable data transmission. In such prior art techniques, if an ACK is not received, the magnitude of the physical error rate is compensated by resending the data. In particular, in transaction type communications where the sensor node is initialized and negotiation type communications where a voice session is established, it is required to perform a state transition with synchronization between the sensor node SS and Peer, and unless the previous data delivery is successful, there cannot be a transition to delivery of the following data. Moreover, when setting up the operating parameters of the sensor node SS interactively, for example a command which requires the present operating parameters and a command which sets desired parameter values are issued sequentially, so sequential operation is performed wherein the command which is to be issued next, is determined after receiving a response message to each command. In these cases also, the problem of only being able to deliver data sequentially during the actual operation, and in particular each cycle of the intermittent operation of the sensor node SS, is the same as in FIG. 3.

Hence, with regard to downstream data in the sensor node SS, the need arises to sequentially transmit plural data in many situations. However, as was shown in FIG. 3, within the limits of the prior art techniques concerning intermittent operation and polling methods, it was not possible to simultaneously achieve low power performance of the sensor node SS and enhancement of responsiveness to delivery of plural data. With the limitations of the conventional technique, a choice had to be made as to whether to sacrifice the response performance of plural data delivery to improve the low power performance of the sensor node, or to sacrifice the low power performance of the sensor node to improve the response performance of plural data delivery.

FIG. 8 is a diagram showing the transition state in the sensor node SS1 applying the invention.

The regular sleep state "Regular Sleep" and the regular processing state "Regular Processing" correspond to the sleep state "Sleep" and the task processing state "Task Processing" shown in FIG. 1. The characteristic of the invention is the feature of providing a short sleep state "Short Sleep" and temporary processing state "Temporary Processing."

Although the case is shown where the length of the short sleep period "Short Sleep" is 3 seconds as an example in the diagram, it may be longer or shorter than this.

It may also be modified dynamically by a command from the middleware server, system manager or application user. Moreover, the sensor node SS1 may itself dynamically modify the short sleep period "Short Sleep" according to the situation.

The length of the short sleep period "Short Sleep" is preferably a short value sufficient to satisfy the responsiveness required by the application, but in order to avoid wasteful polling losses, it is preferably made longer than the roundtrip time between the sensor node and middleware server.

In application to a sensor network system containing a multi-hop wireless environment, at least one second must be allowed for the roundtrip time for data between the sensor node and middleware server, taking account of collision avoidance (CSMA/CA) delays and increased resend delays in each communications hop when wireless conditions are poor or during congestion.

Moreover, the actual transmission frequency of plural data also depends on the application type. In the case of delivering voice messages, it is desired to have sufficient throughput to transmit a large volume of data as far as possible. On the other hand, when a command is issued interactively by the system manager, the previous command, the thinking time of the system manager from when a reply is confirmed to the issuance of the next command, and the operating time of the management terminal "Management Client" must all be taken into consideration, so a delay of about 10 seconds should be allowed for.

In this embodiment also, the sensor node SS1, when a timer in the regular sleep state "Regular Sleep" (10 minutes in the diagram) runs out, shifts to the regular processing state "Regular Processing," and upstream data generation by sensing, transmission of the generated upstream data, confirmation of downstream data by polling, reception of this data when there is downstream data, and processing of the received data, are performed. Also, in the regular processing state "Regular Processing," sensing is performed based on prior settings, and data is collected/accumulated. The detailed procedure of the sensing operation, including initialization of the Sensor(s), reservation of the data accumulation area, and timing control, are executed by software codes implemented as a Sensor Controller, by a MicroProcessor. As soon as all this processing is complete, the sensor returns to the regular sleep state "Regular Sleep." The essential feature of this invention is the transition to the short sleep state "Short Sleep" due to a message packet "Start-BT Indication" which indicates start of Bulk Transfer in the regular processing state "Regular Processing." Here, the message packet "Start-BT Indication" may be a special packet defined according to the purpose, and may be defined as an ordinary data packet or an information field such as a bit flag contained in an ACK packet. In the short sleep state "Short Sleep," the timer is driven in a short time (in the diagram, 3 seconds) compared to the time in the regular sleep state "Regular Sleep," and when the timer has finished, there is a shift to the temporary processing state "Temporary Processing." The time for this short sleep state "Short Sleep" is an initial value, or is preset at the terminal by using a setting command. In the temporary processing state "Temporary Processing," unlike the case for the regular processing state "Regular Processing," various processing related to the downstream data is performed, such as confirmation of downstream data by polling, and if there is downstream data, only reception of this data and processing of the received data are performed. The reason why sensing is not performed in the temporary processing state "Temporary Processing," is because this state is a state having been specially provided to perform processing related to reception of downstream data. Sensing is performed based on a regular measurement period specified by a predetermined application, i.e., the period (in the diagram, 10 minutes) of regular processing state "Regular Processing" regardless of whether there is any downstream data or not. Hence, by separating the regular processing state "Regular Processing" and the temporary processing state "Temporary Processing," scheduling of sensing and scheduling of downstream plural data receive can be controlled independently.

Immediately after completing the processing of these sequences, the sensor node SS1 returns to the short sleep state "Short Sleep." Thereafter, the sensor node SS1 repeats the state transition between the short sleep state "Short Sleep" and the temporary processing state "Temporary Processing," i.e., a Temporary Operation. The sensor node SS1 returns to Regular Operation, i.e., the transition state between the regular sleep state "Regular Sleep" and the regular processing state "Regular Processing" at a time (A) when a message packet "Stop-BT Indication" signifying the end of collective transfer in the temporary processing state "Temporary Processing," is received. At this time, the sensor node SS1 usually changes from the temporary processing state "Temporary Processing" to the regular sleep state "Regular Sleep," and then returns to Regular Operation henceforth. Depending on the installation, there may be a return to Regular Operation at a time (B) when it is detected by polling that there is no downstream data in the temporary processing state "Temporary Processing." Either of the return conditions (A) and (B) may be applied, or both may be applied together. Furthermore, additional conditions, for example, the maximum period of Temporary Operation may be specified, and a return made to Regular Operation when this timer is finished.

Overall control of this transition state is performed when a software code installed as a Task Manager is executed by a MicroProcessor. Also, ON-OFF control of the power supply to each hardware functional unit which is needed in the case of a two-way transition between the sleep state and the operating state, is performed when a software code installed as a Power Manager is executed by the MicroProcessor.

FIG. 9: Plural Data Sequential Issue Sequence

FIG. 9 is a diagram describing a communications when the Middleware Server continuously and sequentially transmits plural data to the sensor node SS1. First, the correspondence relation between FIG. 2 and FIG. 3 will be described.

For the sensor node SS1, the router node RT1 plays the role of the parent node "Parent." Also, the gateway node GW1 plays a role which relays data between the Middleware Server and the router node RT1. However, since there is no major technical feature in this relay function, in the diagrams, only positions corresponding to multi-hop node (Multi Hop) are shown in FIG. 2 and FIG. 3, and the details of the actual relay procedure are omitted from the diagrams. These diagrams are diagrams focusing on communications from the Middleware Server to the sensor node SS1, but communications to other sensor nodes may also be described by diagrams which are essentially similar to these diagrams. For example, in the communications addressed to the sensor node SS6, the router node RT4 plays the role of the parent node "Parent." Moreover, three sets of nodes, the router node RT3, RT2, and gateway node GW2, play the role of a multi-hop node (Multi Hop).

As was described in FIG. 4, four types (1)-(4) of starting points of data transmission to the sensor node are possible, but here we shall focus on their common route, and consider that the Middleware Server is the starting point.

Next, we shall describe the communications sequence itself, but first we shall mention some points concerning FIG. 9. For ease of drawing, regarding the scale in the vertical direction of the diagram, i.e. the time axis direction, the time sequence relation is shown correctly, but the scale of the time which is actually required is not shown. Specifically, the time required for the regular processing period "Regular Processing" and the temporary processing period "Temporary Processing" is of the order of about 50 ms at most. On the other hand, it is assumed here that the short sleep period "Short Sleep" is fixed at 3 seconds. In the drawing, these are both shown as having scales of the same order, but this is only for convenience of drawing.

As an initial state, it will be supposed that the sensor node SS1 is in the state where Regular Operation is performed. Suppose that while the sensor node SS1 is in a regular sleep period "Regular Sleep A" for 10 minutes, the continuous plural data "Data A, Data B, Data C" were generated in the Middleware Server. This state occurs when for example the sensor node SS is an information terminal device attached to a person's body, and a voice message is received from the communications partner "Peer." In order to prevent buffer overflow in the router node RT1, the Middleware Server must transmit data sequentially while waiting for an acknowledgment "ACK" from the sensor node SS1, which is the same as in FIG. 3. However, the difference from FIG. 3 is that before transmitting the plural data, the Middleware Server first transmits a message packet "Start-BT Indication" signifying the start of a Bulk Transfer addressed to the sensor node SS1. Various configuration examples of the message packet "Start-BT Indication" are described later, but in the simplest embodiment, it is sufficient if the sensor node SS1 which is on the receiving side receives a message containing information identifying the message type, for example an identifying information field in one packet. The transmitted message packet "Start-BT Indication" is buffered in the router node RT1 until it is received by the router node RT1 and the sensor node SS1 polls. This buffering time is set depending on the timing of the regular operation period of the sensor node SS1 at which the message packet "Start-BT Indication" was transmitted, for example a minimum of 0 minutes and a maximum of 10 minutes.

When the sensor node SS1 enters the regular processing state "Regular Processing A" from the regular sleep state "Regular Sleep A," the sensor node SS1 performs a polling "Polling A" to the router node RT1, and it receives a message packet "Start-BT Indication." An acknowledgment "ACK [Start-BT]" which shows that the sensor node SS1 received this message packet "Start-BT Indication" is addressed and returned to the Middleware Server, and subsequently, the routine immediately shifts to Temporary Operation without performing polling again. In the embodiment, it shifts to the short sleep period "Short Sleep A" for 3 seconds. The processing details of the node which received the command will be described later.

On the other hand, the acknowledgment "ACK [Start-BT]" transmitted by the sensor node SS1 is promptly sent to the Middleware Server via the router node RT1. When the Middleware Server receives the acknowledgment "ACK [Start-BT]", the router node RT1 has already completed delivery of the message packet "Stop-BT Indication" to the sensor node SS1.

Hence, it is ensured that the buffer for the sensor node SS1 managed by the router node RT1 was empty. Therefore, the Middleware Server can transmit the first data "Data A" addressed to the sensor node SS1 promptly after receiving the acknowledgment "ACK [Stop-BT]". The transmitted data "Data A" is received by the router node RT1, and is buffered in the router node RT1 until the sensor node SS1 polls.

On the other hand, the sensor node SS1 enters the short sleep period "Short Sleep A" for 3 seconds just before this. After this sleep period is completed, the sensor node SS1 returns to the temporary processing period "Temporary Processing A," and performs a polling "Polling B" to the router node RT1. Here, the data "Data A" previously buffered by the router node RT1 is passed to the sensor node SS1. Subsequently, the sensor node SS1 returns an acknowledgment "ACK [Data A]" which shows that Data A was received to the Middleware Server, and it again promptly shifts to the short sleep period "Short Sleep B" for 3 seconds.

Henceforth, identical operations are performed for delivery of Data B and Data C. The sensor node SS1, during a state transition to Temporary Operation, i.e., while repeating the short sleep state "Short Sleep" and temporary processing state "Temporary Processing," performs polling to the router node RT1 at a rate of once in 3 seconds, and acquires Data B, Data C sequentially.

Also, the Middleware Server can transmit Data B, Data C at a rate of once in 3 seconds by receiving an ACK from the sensor node SS1 once in 3 seconds.

Finally, after completing delivery of Data C, the Middleware Server transmits a message packet "Stop-BT Indication" signifying that Bulk Transfer is completed, to the sensor node SS1.

After the transmitted message packet "Start-BT Indication" was buffered in the router node RT1, when the sensor node SS1 completes the 3 second short sleep period "Short Sleep D" and returns to the temporary processing state "Temporary Processing D," it is acquired by the sensor node SS1 by a polling "Polling E." The sensor node SS1, after returning an acknowledgment "ACK [Start-BT]" showing that this message packet "Stop-BT Indication" was received to the Middleware Server, promptly shifts to a 10 minute regular sleep period "Regular Sleep B."

This completes Temporary Operation. Subsequently, the sensor node returns to Regular Operation, i.e., alternating between the regular sleep period "Regular Sleep" and the regular processing period "Regular Processing."

Due to the arrangement of this example, low power properties and long-term driving properties are very much stressed, the intermittent operating cycle in the regular operation state is lengthened, and even for a sensor node SS1 which could not achieve a good response performance for plural data transmission according to the prior art technique, it is possible to enhance response performance when simultaneously transmitting plural data while maintaining low power performance.

In this embodiment, the case was described where the router node RT1 can provide only one of the data addressed to the sensor node SS1. In such a situation, to prevent buffer overflow in the router node RT1, the Middleware Server had to transmit data sequentially while waiting for an ACK to each data, but as already stated, the situation where the Middleware Server must transmit plural data sequentially occurs widely without being limited to this situation.

For example, there is the case where it is necessary to receive an ACK to each data in order to transmit data reliably. In particular, this applies to the case of transaction communication such as when initializing the sensor node, and negotiation communication such as when establishing a voice session. Moreover, when the System Manager sets up the operating parameters of the sensor node SS1 interactively, sequential operation is performed, for example, a command which acquires the present operating parameters and a command which sets a predetermined parameter value are issued sequentially, and after receiving a response message to each command, the command to be issued next is determined. In these cases also, the response time is too long if the present invention is not applied, and the response time is shortened if the present invention is applied, which is identical to the case described in FIG. 3 and FIG. 9.

In this embodiment, the Middleware Server does not specify the intermittent operating cycle when the sensor node SS1 enters Temporary Operation, but this is specified by the autonomous determination of the sensor node SS1 itself. The Middleware Server merely notifies start of plural data transmission by the message packet "Start-BT Indication".

Regarding implementation of this point, several modifications can be considered. The simplest implementation method is to have the sensor node SS1 previously read a value showing the intermittent operation period during Temporary Operation, and store it as a fixed value in a Read-Only Memory. The sensor node SS1 then determines the intermittent operating cycle during Temporary Operation, i.e., the time of Short Sleep, in a fixed manner based on this value when the message packet "Start-BT Indication" is received. Specifically, as for the packet received by polling, the header and payload of the packet are analyzed by the ZigBee Communicator. If, as a result of the analysis, this packet includes identifying information meaning message packet "Start-BT Indication," the ZigBee Communicator will notify this information to the Task Manager. At this time, the Task Manager shifts operation of the MicroProcessor to Temporary Operation, and when it enters Short Sleep, after setting the time of Short Sleep (in the diagram, 3 seconds) which is stored in a fixed manner in the Read-Only Memory, in the Timer, the MicroProcessor is shifted to the sleep state.

In the case of a transition to the sleep state, the Power Manager instructs the MicroProcessor to perform control to stop power supply to all hardware functions except the Timer and the Interrupt Controller. According to another method, the initial value of the aforesaid Short Sleep time is stored in the Read-Only Memory in a fixed manner, the actual runtime value of the Short Sleep time is stored by the Nonvolatile Memory, and this value can be modified during operation by a setting command from the Middleware Server.

In this case, the setting command issued by the Middleware Server may contain an identifying information field showing a command which changes the time of Short Sleep, and a field which specifies the time of the new Short Sleep in ms units. When it has such a construction, the System Manager can set the time of Short Sleep as a unique value for each sensor node. For example, communication with a sensor node having a small number of relays in the multi-hop, is completed with a shorter communications delay than communication with a sensor node having a large number of relays in the multi-hop. For example, if a communications delay of 100 ms is expected for the roundtrip of one hop, since the number of relays between the Middleware Server and router node RT1 which is the parent node of the sensor node SS1, is two hops including the cable section, the Short Sleep time of the sensor node SS1 should be set to 200 ms or a larger value than this. On the other hand, since the number of relays between the Middleware Server and the parent node of the sensor node SS6 including the cable section is 4 hops, the Short Sleep time of the sensor node SS6 should be set to 400 ms or a larger value than this. In this way, the Short Sleep time of each sensor node is adjusted to the most suitable value for each installation environment, and the responsiveness of the system as a whole can be maximized.

In yet another method, the message packet "Start-BT Indication" transmitted by the Middleware Server contains information relating to properties of the data to be transmitted henceforth, and the transmission timing. In this method, the sensor node SS1 dynamically determines the actual Short Sleep time based on the aforesaid information.

In this case, the information stored in the message packet "Start-BT Indication" may include one or more of the data type to be transmitted, total number, delivery priority, permitted delivery delay time, desired transmission time and desired transmission time interval. For example, when the data type is real-time speech, in order to complete data receive and playback as soon as possible, the sensor node SS1 preferably makes the Short Sleep time as short as possible, but when the data type is non-real-time speech, if the sensor node SS1 has a Volatile Memory of sufficient capacity, it may be played back slowly after all the data has been received, so it is not necessary to make the Short Sleep time very short. Likewise, when information such as the number of data and delivery priority is used, the sensor node SS1 can automatically set the Short Sleep time itself.

Various modifications may be made to the method of dynamically setting the Short Sleep time, but in every case, the delivery of the data itself is performed by the main polling from the sensor node SS1, so unlike the case of JP-A 2004-320153, there is no data transmission failure even if precise synchronization of the Middleware Server and sensor node SS1 is not performed, and stable data delivery can be achieved while maintaining low-power performance of the sensor node SS1.

The means of applying these various methods relating to the determination of the Short Sleep time are used according to the scale of the sensor network system to which the method will be applied, and to the characteristics of the application.

For example, in a method wherein the Short Sleep time is fixed, less functions are available than in a method where it can be varied dynamically, however the control that has to be implemented in the sensor node SS1 is simple, and the size of the required program code may be small. Also, if there is not so much scatter in the number of relays of the multi-hop for each sensor node and the traffic amount is relatively small compared to the communications capacity, sufficient practicability can be obtained by method wherein the Short Sleep time is fixed. On the other hand, when there is a large difference in the number of relays in the multi-hop for each sensor node, when the traffic amount largely varies over time and when there are plural data types having largely different performance requirements for real-time delivery, a method is used where the Short Sleep time can be modified by a command, or can be dynamically modified by the autonomous decision of the sensor node SS1.

In a variation of the aforesaid methods, the Middleware Server specifies individual data delivery schedule times by a message packet "Start-BT Indication" to a precision of ms, and the data are actually transmitted from the router node RT1 to the sensor node SS1 at that time. In such a case, it would appear that in the sensor node SS1, polling which is an assumption of the invention is unnecessary, but in order to synchronize data transmission and reception between the sensor node SS1 and router node RT1 to a precision of ms, an expensive high-precision timer is required for the sensor node SS1 and router node RT1. Moreover, the wireless communications environment is not necessarily always good, and since delivery of data to the router node RT1 may be slowed down due to noise or congestion, even if for example a highly precise timer is installed, it is difficult to guarantee in practice that data will be transmitted with a precision of ms at the scheduled time specified by the router node RT1. Also, if the error between the scheduled time and actual transceiver time becomes several ms or more, if the receive standby time in the sensor node is not increased, data delivery will be unsuccessful, and the low power performance of the sensor node will be considerably impaired compared to the present invention contrary to intention.

As described above, regarding downstream communication to the sensor node, it may be necessary to perform sequential transmission of plural data in many situations. However, as shown in FIG. 3, within the limits of the conventional technique regarding the intermittent operation mode and polling, improvement in the low power performance of the sensor node and the response performance of plural data delivery could not be obtained simultaneously. Moreover, an alternative plan to enhance the precision of time synchronization and put the sensor node into a short-term standby state only at the scheduled transmission time is accompanied by various difficulties in practice and is not widely applied.

In the invention, since time synchronization is unnecessary and the waking time of the sensor node is kept to the minimum, it is possible to achieve both low-power performance of the sensor node and ease of practical application.

In this diagram, although the case was shown where the message packet "Start-BT Indication" signifying start of bulk transfer is a special packet specially defined for this purpose, as already described, it may be defined also as an information field such as a bit flag contained in an ordinary data packet or an ACK packet. Specifically, for example, the Middleware Server may transmit a data packet containing the Start-BT Indication field in the header unit, and Data A in the payload unit.

In this case, since the packet delivery divided into two in the diagram, i.e., a Start-BT Indication packet and a Data A packet, can be delivered in only a single packet, the time until delivery of all the data is complete is correspondingly reduced. Moreover, although not shown in the diagram, the sensor node SS1 should perform upstream communications which transmits sensing data to the Middleware Server immediately prior to the Polling A, and consequently, an ACK packet should be delivered from the router node RT1 to the sensor node SS1. Therefore, the number of pollings of the sensor node SS1 can also be reduced to one by including the Start-BT Indication field in the header unit of this ACK packet. Hence, the delivery of information showing the Start-BT Indication is not limited to delivery of the special packet shown in the diagram, and may be delivery by another packet and condensed format.

In the diagram, the case was described where plural data was transmitted sequentially, but the operation in the case of interactive data delivery wherein the next command to be issued is determined while verifying the execution result of the immediately preceding command, may be described by a communication sequence which is substantially the same as that in the diagram.

In such a case, the ACK packet in this diagram, as was already described, is not an ACK message showing data delivery, but a return ACK packet including the feasibility/non-feasibility of the command processing result. Likewise, in the diagram, the ACK packet has the same name throughout all the communication sections, but the ACK packet transmitted by the sensor node SS1 to the router node RT1, the ACK packet forwarded by the router node RT1 to the gateway node GW1, and the ACK packet forwarded by the gateway node GW1 to the Middleware Server, may be defined by different names on the communications route table, and additional information may be assigned when they pass through the router node RT1 or gateway node GW1.

For example, the ACK contained in the ACK packet transmitted by the sensor node SS1 to the router node RT1, may contain only the sequence number of the target data, and it was also designated as an ACK packet in the table of telecommunications standards. However, the packet transmitted by the router node RT1 to the gateway node GW1 immediately after receiving this packet, contains not only the sequence number, but also an identification field signifying a request for transmitting the next data, and it may be designated also as a data request message in the table of telecommunications standards. When the router node RT1 is equipped with a mass Volatile Memory, and it is possible to buffer plural data which the Middleware Server is attempting to transmit, a field signifying how much further data is required can be included in the aforesaid data request message. A similar modification may be applied to the ACK packet forwarded by the gateway node GW1 to the Middleware Server. Hence, some modifications may be considered for the type of ACK and designated names on the communications routes, but provided that it is a packet which is generated when data arrives at the sensor node SS1 in the order of the communication sequence, at least for transferring information relating to the sequence number of this data to the Middleware Server, it may be considered as one aspect of the ACK generally referred to in this embodiment whatever definition it may have, and whatever additional information it may contain.

When the router node RT1 is able to buffer plural data as described above, the sensor node SS1 does not perform polling only once in each temporary processing period "Temporary Processing," but in the same way as the task processing period "Task Processing" in FIG. 2, polling may be repeated provided that there is data buffered in the router node RT1. However, even if the router node RT1 is equipped with a mass capacity Volatile Memory, in the case of interactive delivery, only one data will be buffered at a time in the router node RT1 after all. Therefore, in such a case, as a similar measure to the modification already described, it is effective if the data type which it is intended to deliver is contained in the message packet "Start-BT Indication," and the sensor node SS1, after identifying whether the data to be transmitted after this message is to be transmitted sequentially or in one operation, determines whether to perform polling only once or to repeat polling in each temporary processing period "Temporary Processing."

FIG. 10: Plural Data Sequential Issue Sequence (Forced Waking)

Here, further shortening of the response time to the completion of plural data delivery of the embodiment shown in FIG. 9, is considered.

In FIG. 9, regarding plural data delivery after the sensor node SS1 starts Temporary Operation, the response performance was greatly enhanced compared to the prior art, but the time required for the data initially transmitted by the Middleware Server, which in this embodiment is the Start-BT Indication message packet, to be received by the sensor node SS1, is still the same as in the prior art. Hence, if it is transmitted with a timing which happens to coincide with the intermittent operating cycle, the buffering time is 0 and is effectively transmitted in real time, but in the worst case, it will take 10 minutes which is the same as the intermittent operating cycle. When there is no correlation between the intermittent operation timing and data generation timing, the average value of this required time is estimated to be 5 minutes.

Hence, as a further improvement of the invention, it is attempted to shorten the delivery time of the initial data.

FIG. 10 is a diagram showing a communication sequence which adds an improvement which performs forced waking of the sensor node SS1, to the communications sequence shown in FIG. 9. The only difference from FIG. 9 is the transmitting method of the Start-BT Indication message. The router node RT1 transmits a Start-BT Indication message using the RF Transmitter (Aerial Feeding). Even if the sensor node SS1 is for example in the sleep period "Regular Sleep A," this message is received by the RF Receiver (Aerial Fed), and is inputted into the Interrupt Controller in the MicroProcessor. The Interrupt Controller generates an interrupt signal, the MicroProcessor performs a Forced Wakeup upon an instruction of the Power Manager, the regular sleep period "Regular Sleep A" is canceled, and promptly changes to the regular processing period "Regular Processing A." Next, an acknowledgment "ACK [Start-BT]" to the previous Start-BT Indication message is transmitted, Temporary Operation starts, and promptly shifts to the 3 second short sleep period "Short Sleep A."

Hence, when the Start-BT indication message is transmitted and received in this way using the RF Transmitter (Aerial Feeding) and wireless receiver RF Receiver (Aerial Fed), the router node RT1 can transmit a Start-BT Indication message promptly, without waiting for polling from the sensor node SS1. Moreover, since the sensor node SS1 receives this message even if it is in the regular sleep period "Regular Sleep A," it promptly shifts to Temporary Operation, so the time required from Data Generation to when the initial data "Data A" is transmitted, i.e., the required time "Response Delay" until delivery of a Start-BT Indication message is completed, can be reduced to near real-time, specifically to the order of one second even if multi-hop communication time is included.

As a result, the required time "Transaction Delay" until delivery of all the data Data A, Data B, Data C is completed, is reduced to about 10 seconds.

Figure 11:
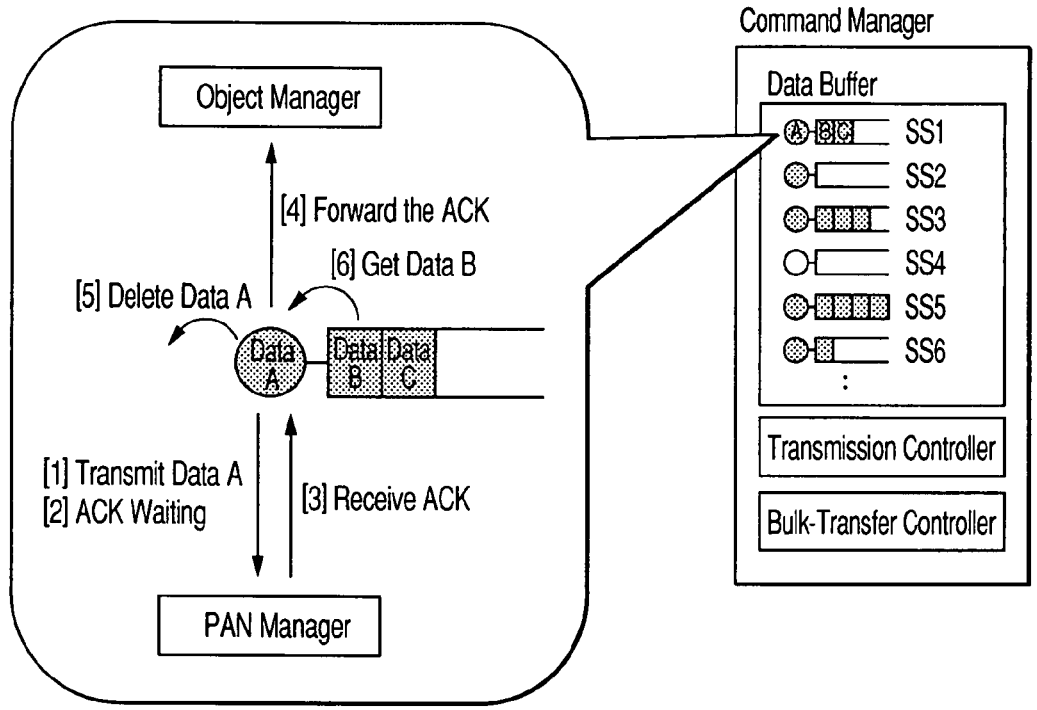
FIG. 11 is likewise a diagram showing the detailed composition and detailed operation of a Command Manager in a Middleware Server.

FIG. 11: Command Manager Details

FIG. 11 is a diagram showing the detailed construction and detailed operation of the Command Manager in the Middleware Server.

The right-hand side of the diagram shows the detailed construction of the Command Manager.

The Command Manager includes a Data Buffer for buffering the data transmitted to each sensor node, a Transmission Controller for controlling operation during data transmission, and a Bulk-Transfer Controller for controlling operation during plural-data transmission. In order to separately control data transmission addressed to each sensor node, the Data Buffer is separately managed for each sensor node. In addition, as the physical embodiment of these elements, a memory region which is physically independent may be assigned to each sensor node, and management of each data may be performed by matching identifying information showing the destination sensor node and identifying information showing the transmission sequence between data addressed to the same destination, while the data addressed to all sensor nodes is stored in a common memory area.

Likewise, although in the diagram, the Transmission Controller and the Bulk-Transfer Controller are shown as single functional units, an independent state transition may be managed for each sensor node by assigning a separate memory area to each sensor node, or by partitioning with information identifying each sensor node in the common memory area.

The left-hand side of the diagram focuses on data addressed to the sensor node SS1, and shows the operating details of the Command Manager. Here, the process performed by the Transmission Controller will be described. Now, assume that three data, i.e., Data A, Data B, and Data C are buffered by the sensor node SS1. At this time, the initial Data A is first transmitted to the PAN Manager as in procedure "1". Then, there is a shift to the state "2" in which an ACK to Data A is awaited. In this diagram, the case "3" is shown when an ACK was received within the waiting time. In this case, this ACK is forwarded to the Object Manager as in procedure "4". Since delivery processing of Data A is completed at this time, Data A is then deleted from the buffer head as in procedure "5", and the following Data B is acquired by the buffer head as in procedure "6".

Figure 12:
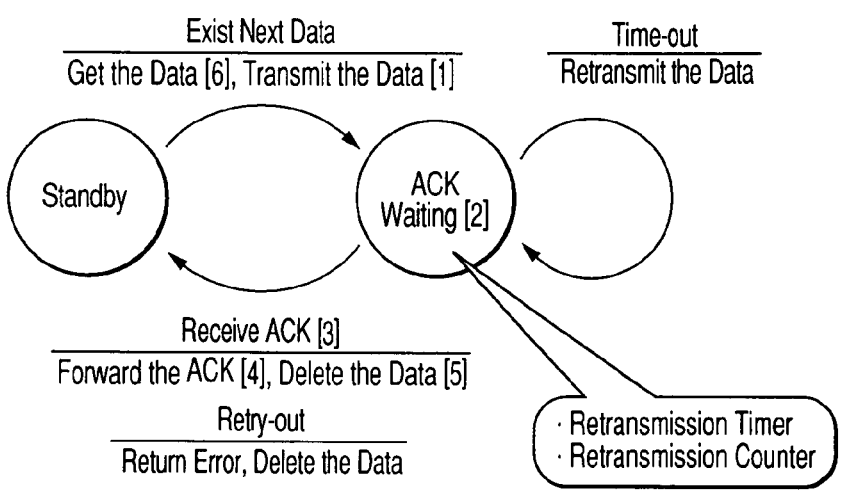
FIG. 12 is likewise a state transition diagram of a Transmission Controller in the Command Manager.

FIG. 12: Command Manager State Transition: Data Transmission Control

FIG. 12 is a diagram showing the state transitions when the Transmission Controller in the Command Manager is managed for each sensor node. The operation shown by two lines attached to the arrow represents an event which triggers a state transition when the upper line represents the origin state of the Arrow, and the lower line represents an action performed during a state transition. The numerals "1"-"6" in the diagram correspond to a procedure or state shown in FIG. 11.

The Command Manager manages two states, the Standby state and the ACK Waiting state for each sensor node. The standby state "Standby" is the state which occurs when there is no data addressed to the sensor node in the Data Buffer, and immediately after one data delivery process is complete as shown in procedure "5" of FIG. 11. In the standby state "Standby," if there is following data which should be processed in the buffer, the Transmission Controller acquires this data in the buffer head, and after transmitting it to the PAN Manager, it shifts to the ACK waiting state "ACK Waiting." In the ACK waiting state "ACK Waiting," a Retransmission Timer for measuring the continuation time of this state, and a Retransmission Counter for measuring the number of times this state was repeated, are managed.

The procedure "3" is the case where an ACK was received within a predetermined time after entering the ACK Waiting state, i.e., before the Retransmission Timer, times out. After the Command Manager performs forwarding of this ACK of procedure "4" and data deletion data of procedure "5", it returns to the standby state "Standby." On the other hand, when the Retransmission Timer performs a timeout without receiving an ACK, up to a predetermined number of times, i.e., while the Retransmission Counter is below a predetermined value, it resends this data and returns again to the ACK waiting state "ACK Waiting." When an ACK is not received even if it resends the predetermined number of times, i.e., when retry out occurs, the Command Manager gives up trying to resend the data any more. In this case, by returning a delivery failure error to the object manager Object Manager, error recovery control is left to the Object Manager which is an upper level layer.

Next, after deleting or updating this data, it returns to the standby state "Standby."

Hence, the Command Manager, due to the timeout of the Retransmission Timer, resends data a predetermined number of times, so a communication which is robust to data loss due to temporary worsening of the communications environment and which is highly reliable, can be performed.

Simultaneously, an error is returned to the upper layer for a predetermined number of resend failures, so the upper layer or system manager is notified and recovery processing can be requested without uselessly repeating resends due to long-term worsening of the communications environment.

FIG. 13: Command Manager State Transition: Bulk Transfer

FIG. 13 is a diagram showing the state transition when the Bulk-Transfer Controller performs management for each sensor node.

For each sensor node, the Bulk-Transfer Controller manages two states, i.e., a bulk transfer release state OFF-BT, and a bulk transfer state ON-BT.

In the bulk transfer release state OFF-BT, when two or more data addressed to this sensor node are buffered in the Data Buffer, the Bulk-Transfer Controller generates a bulk-transfer start message "Start-BT Indication," and after insertion in the header of the Data Buffer, it shifts to the bulk transfer state ON-BT.

On the other hand, in the bulk transfer state ON-BT, when there is no more data addressed to this sensor node from the Data Buffer, the Bulk-Transfer Controller generates a Stop-BT Indication, and after insertion in the header of the Data Buffer, it shifts to the bulk transfer release state OFF-BT.

Since the Bulk-Transfer Controller operates according to this state transition, the Middleware Server implements a function which issues the bulk-transfer start message "Start-BT Indication" and bulk-transfer stop message "Stop-BT Indication" to this sensor node at the timings shown in FIG. 9 and FIG. 10.

In a case such as interactive command transmission, a management terminal "Management Client" and an application terminal "Application Client" control the start and end of interactive processing. Hence, these clients directly transmit a Start-BT Indication message, a Stop-BT Indication message, or a message that has a meaning equivalent to these. Therefore, in this case, it is not necessary for the Bulk-Transfer Controller to control the operation of the sensor node.

FIG. 14: Node Management Table in PAN Manager

FIG. 14 is a diagram showing the construction of a node management table managed by the PAN Manager in the Middleware Server.

When transmitting data addressed to a specific sensor node, this node management table is looked up to determine the gateway node of the forwarding destination and to generate destination information on a packet header. The table entries correspond to information about each sensor node, and manage information which needs to be looked up when transmitting data addressed to this sensor node. Each entry is managed using an index value "Sensor Node Index" allocated uniquely by the Object Manager to this sensor node. Here, the index value "Sensor Node Index," is common information which middleware functional units, such as not only the Object Manager or PAN Manager but also the Data Manager, Command Manager and Event Publisher, etc., use to identify the sensor node.

Access to each entry is made using this index value "Sensor Node Index." From this table, an address value of a sensor node corresponding to this index value "Sensor Node Index," the ID value of the PAN which belongs to it, and the address value of the gateway node in the PAN, can be looked up. Among these, the address value of the sensor node and ID value of the PAN which belongs to it are information which forms the header of the wireless packet of the ZigBee standard. The PAN Manager adds this information to the data addressed to each sensor node transferred from the Command Manager, so the ZigBee Adapter which actually generates a packet can add header information required for generation to the header information of a wireless packet of the ZigBee standard. On the other hand, the address value of the gateway node in this table shows the gateway node to which data addressed to this sensor node, should be forwarded. For example, it is seen that the data addressed to the sensor node SS1 may be forwarded to the gateway node shown by (GWaddr1), i.e., GW1. Likewise, it is seen that data addressed to the sensor nodes SS2, SS3, may be forwarded to the gateway node shown by (GWaddr2), i.e., GW2, and data addressed to the sensor nodes SS7, SS8 maybe forwarded to the gateway node shown by (GWaddr3), i.e., GW3. The PAN Manager adds this information to the data addressed to each sensor node transferred from the Command Manager, so the ZigBee Adapter which actually transmits a packet can determine to which gateway node this packet should be forwarded.

Since delivery of data from a gateway node to each sensor node can be performed by autonomous operation of the gateway node or router node, in the Middleware Server, it is not necessary to specify even a communications route in the PAN. The gateway node performs general routing control in the wireless network, and the relay during each hop of the multi-hop path is autonomously controlled by the router node. In FIG. 4, the PAN Controller of the gateway node GW1 manages information on a list of nodes which belong to PAN1 (here, RT1 and SS1), and manages information on the parent node (here, RT1) of the sensor node (here, SS1) which belongs to PAN1 as compositional information on PAN1. Also, the Routing Manager of the gateway node GW1 or router node RT1 manages routing control information for the multi-hop communication in PAN1. This information is distributed and updated depending on the communications sequence when the router node RT1 and sensor node SS1 are connected to PAN1, and regular routing information exchanges between adjacent router nodes. Therefore, even when the composition of the wireless network dynamically varies due to changes in the communication environment, or movement of each node, this is followed autonomously, and the gateway node and router node can update routing control dynamically.

The data delivery procedure in the wireless network will now be described taking data addressed to the sensor node SS8 as an example.

The data addressed by the Middleware Server to the sensor node SS8, is forwarded to the gateway node GW3 by passing through the PAN Manager or ZigBee Adapter, as described above. By referring to compositional information on PAN3 held by the PAN Controller, the gateway node GW3 comes to know that the parent of the sensor node SS8 is the router node RT7. Further, by referring to the routing information held by the Routing Manager, it comes to know that the relay destination for sending data to the router node RT7 is the router node RT5 or RT6. As to whether the router node RT5 or RT6 is selected as the relay destination, the route discovered above may be constantly given priority, or selection may be made according to the measured communication quality based on the packet error rate. The router node RT5 or RT6 to which this data was forwarded as a relay destination likewise knows that the router node RT7 which is a forwarding destination can communicate with itself directly by looking up the routing information held by its Routing Manager.

In this way, the data addressed to the sensor node SS8 is relayed to the multi-hop path in PAN3, and is forwarded to the router node RT7 which is a parent. Data delivery from the router node RT7 to the sensor node SS8 is performed by polling from the sensor node SS8 as shown by FIG. 9 and FIG. 10.

As mentioned above, since the PAN Manager holds a node management table, the Middleware Server can send data to any sensor node.

The wireless network composition information held by the PAN controller in the gateway node, and routing information in the wireless network held by the Routing Manager in the gateway node or router node, are distributed and updated according to the communications sequence when the router node or sensor node is connected to the wireless network, and regular routing information exchange between adjacent router nodes. Therefore, even when the composition of this wireless network dynamically varies due to changes in the communication environment, or movement of each node, this is followed autonomously, and the gateway node and the router node can update multi-hop path control dynamically. Likewise, as regards the node management table in the Middleware Server shown in FIG. 14, the composition of the wireless network can be made to follow any dynamic changes automatically, so the system manager does not need to update it manually.

Specifically, the 3 types of information held by the node management table (address value of the sensor node, ID value of the corresponding PAN and address value of the gateway node in this PAN), are all held by the gateway node as its own information or held as management information of the PAN Controller. Therefore, for example, the gateway node GW1, when the sensor node SS1 connects with PAN1, can transmit a connection notification message including these three types of information to the Middleware Server, and the Middleware Server which received this connection notification message can generate an entry in the node management table corresponding to the sensor node SS1. These three types of information are not limited to when the sensor node is connected, and should be added as additional information when a packet such as measurement data transmitted by the sensor node SS1 is forwarded by the gateway node GW1 to the Middleware Server. Even if the sensor node SS1 later moves and connects to PAN2, the Middleware Server can update the entry of the node management table to the latest state promptly by a similar message notified from the gateway node GW2.

In other words, it can be detected that the PAN to which the sensor node SS1 belongs has changed from PAN1 to PAN2, and that the corresponding gateway node has changed from GW1 to GW2. Therefore, the Middleware Server can not only send data to any sensor node, but also follow the movement of any sensor node automatically.

When such a movement of the above sensor node has occurred, when the route of the downstream data addressed to the sensor node is changed, a situation may temporarily arise that delivery of downstream data slows down. Specifically, it may arise that data is transmitted to PAN1 when the sensor node SS1 moves from PAN1 to PAN2. In such a case, the resend process by the Transmission Controller shown in FIG. 12 functions very effectively. Since the data transmitted to PAN1 immediately after the sensor node seceded from PAN1 is naturally not received by the sensor node SS1, a resend process is soon started by the timeout of the Retransmission Timer. If the connection process of the sensor node SS1 to PAN2 is completed at this time, the node management table held by the PAN Manager is also updated to the latest state, and the resent data is satisfactorily sent to the sensor node SS2 which moved to PAN2. Even if it takes a certain amount of time for the sensor node SS1 to connect to PAN2, a recovery process can be initiated by the upper level layer or system manager by the Command Manager returning an error.

As described above, the PAN Manager manages the node management table, and the Transmission Controller performs resend control, so the Middleware Server can follow the movement of any sensor node automatically, and highly reliable data transmission can be performed.

What is claimed is:

1. A sensor network system comprising:
a server having a storage unit holding data addressed to a sensor node, and a transceiver which performs data transmission and reception to and from a base station;
an intermediate device connected to said server and connected to said sensor node by wireless; and
a sensor terminal connected to said intermediate device via a transceiver, said sensor terminal being to perform an intermittent operation repeating an operating period when power is supplied to a processor, and a first sleep period when power is not supplied,
wherein, in case that said server stores continuous plural data in a storage unit, said server transmits a plural-data transmit start message via said transceiver, and said sensor terminal which received said plural-data transmit start message via said intermediate device, changes over to a second sleep period which is shorter than said first sleep period, and performs a polling to said intermediate device after the sleep of said second sleep period,
wherein, in case that said server receives said polling via said intermediate device from said sensor terminal,
said server sends out said plural data via said transmitter sequentially, when said server completes transmission of said plural data, said server transmits a plural-data transmit end message, and
said sensor terminal which received said plural-data transmit end message then changes over the second sleep period to the first sleep period.

2. The sensor network system according to claim 1, wherein said sensor terminal performs sensing and data generation in said operating period, and in an operating period after receiving said transmit start message, does not perform the sensing operation.

3. The sensor network system according to claim 1, wherein said sensor terminal has a second transceiver which operates during said sleep period, and
wherein, in case that the second transceiver receives a plural-data transmit start message, said sensor terminal is controlled to shift to an operating period.

4. The sensor network system according to claim 1,
wherein the storage unit of said server stores said plurality of data by matching with an identifier of said sensor terminal.

5. The sensor network system according to claim 1,
wherein, in case that said sensor terminal receives data from said server, said sensor terminal sends out a receive verification acknowledgement including identifying information of the data, and
wherein said server determines that transmission of the data is complete by receiving and verifying the receive verification acknowledgement.

6. The sensor network system according to claim 5,
wherein, in case that said server has not received said receive verification acknowledgement within a predetermined time, said server resends said data corresponding to the receive verification acknowledgement via said transceiver, and
wherein, in case that said server has received said receive verification acknowledgement within the predetermined time, said server stops the transmit procedure for the data and starts the next data transmit procedure.

7. The sensor network system according to claim 6,
wherein, in case that said server has not obtained a receive verification acknowledgement after performing a predetermined number of resends, said server stops the resending procedure for the data, and after generating information showing transmit failure, starts the next data transmit procedure.

8. The sensor network system according to claim 1,
wherein, in case that a plurality of data addressed to one sensor terminal are stored in said storage unit, said server generates said plural-data transmit start message, and
wherein, in case that there is no more data addressed to said sensor terminal in said storage unit, said server generates said plural-data transmit end message.

9. The sensor network system according to claim 1,
wherein said server matches up and manages an identifier of said sensor node, a communication address of said sensor node, a network to which said sensor node belongs, and a communication address of a base station, and
wherein said server sends out said plurality of data, said plural-data transmit start message, and said plural-data transmit end message together with the communication address of said sensor node, the network to which said sensor node belongs, and the communication address of said base station.

10. The sensor network system according to claim 9,
wherein, in case that at least one of detection of connection of said sensor node and receive of data sent by said sensor node addressed to said server have been performed, said base station notifies the communications address of said sensor node and the communications address of the base station to said server.

* * * * *